United States Patent
Igarashi et al.

(10) Patent No.: US 6,549,201 B1
(45) Date of Patent: Apr. 15, 2003

(54) METHOD FOR CONSTRUCTING A 3D POLYGONAL SURFACE FROM A 2D SILHOUETTE BY USING COMPUTER, APPARATUS THEREOF AND STORAGE MEDIUM

(75) Inventors: Takeo Igarashi, Chigasaki (JP); Hidehiko Tanaka, Yokohama (JP)

(73) Assignee: Center for Advanced Science and Technology Incubation, Ltd., Tokyo (JP)

(*) Notice: Subject to any disclaimer, the term of this patent is extended or adjusted under 35 U.S.C. 154(b) by 254 days.

(21) Appl. No.: 09/716,406

(22) Filed: Nov. 21, 2000

Related U.S. Application Data
(60) Provisional application No. 60/167,191, filed on Nov. 23, 1999.

(51) Int. Cl.[7] .............................................. G06T 15/00
(52) U.S. Cl. ...................................................... 345/423
(58) Field of Search ................................ 345/419, 440, 345/441, 442, 443, 619, 620, 420, 423

(56) References Cited

U.S. PATENT DOCUMENTS
5,699,497 A * 12/1997 Erdahl et al. ................ 345/428
5,790,134 A * 8/1998 Lentz .......................... 345/502

OTHER PUBLICATIONS

G. Barequet and M Sharir. Piecewise–linear interpolation between polygonal slices. ACM 10th Computational Geometry Proceedings, pp. 93–102, 1994.

T. Baudel. A mark–based interaction paradigm for free–hand drawing. UIST'94 Conference Proceedings, pp. 185–192, 1994.

J. Bloomenthal and B. Wyvill. Interactive techniques for implicit modeling. 1990 Symposium on Interactive 3D Graphics, pp. 109–116, 1990.

J.M. Cohen, L. Markosian, R.C. Zeleznik, J.F. Hughes, and R. Barzel. An Interface for Sketching 3D Curves. 1999 Symposium on Interactive 3D Graphics, pp. 17–21, 1999.

W.T. Correa, R.J. Jensen, C.E. Thayer and A. Finkelstein. Texture mapping for cel animation. SIGGRAPH 98 Conference Proceedings, pp. 435–456, 1998.

M. Deering. The Holosketch VR sketching system. Communications of the ACM, 39 (5):54–61, May 1996.

L. Eggli, C. Hsu, G. Elber, and B. Bruderlin, Inferring 3D models from freehand sketches and constraints. Computer–Aided Design, 29(2): 101–112, Feb. 19997.

C. Grimm, D. Pugmire, M. Bloomental, J. F. Hughes, and E. Cohen. Visual interfaces for solids modeling. UIST '95 Conference Proceedings, pp. 51–60, 1995.

T. Galyean and J.F. Hughes. Sculpting: an interactive volumetric modeling technique. SIGGRAPH '91 Conference Proceedings, pp. 267–274, 1991.

(List continued on next page.)

*Primary Examiner*—Phu K. Nguyen
(74) *Attorney, Agent, or Firm*—Oliff & Berridge, PLC

(57) ABSTRACT

A sketching interface for quickly and easily designing freeform models such as stuffed animals and other rotund objects. The user draws several 2D freeform strokes interactively on the screen and the system automatically constructs plausible 3D polygonal surfaces. The system supports several modeling operations, including the operation to construct a 3D polygonal surface from a 2D silhouette drawn by the user: it inflates the region surrounded by the silhouette making wide areas fat, and narrow areas thin. The system is implemented as a Java(tm) program, and the mesh construction is done in real-time on a standard PC. An informal user study showed that a first-time user typically masters the operations within 10 minutes, and can construct interesting 3D models within minutes.

18 Claims, 33 Drawing Sheets

OTHER PUBLICATIONS

M.D. Gross and E.Y.L. Do. Ambiguous intentions: A paper–like interface for creative design. UIST'96 Conference Proceedings, pp. 183–192, 1996.

P. Hanrahan, P. Haeberli, Direct WYSIWYG Painting and Texturing on 3D Shapes, SIGGRAPH 90 Conference Proceedings, pp. 215–223, 1990.

H. Hoppe, T. DeRose, T. Duchamp, J. McDonald, and W. Stuetzle. Mesh optimization. SIGGRAPH 93 Conference Proceedings, pp. 19–26, 1993.

J. Hultquist. A virtual trackball. Graphics Gems (ed. A. Glassner). Academic Press, pp. 462–463, 1990.

J.A. Landay and B.A. Myers. Interactive sketching for the early stages of user interface design. CHI '95 Conference Proceedings, pp. 43–50, 1995.

R. MacCracken and K.I. Joy. Free–form deformations with lattices of arbitrary topology. SIGGRAPH 96 Conference Proceedings, pp. 181–188, 1996.

L. Markosian, M.A. Kowalski, S.J. Trychin, L.D. Bourdev, D. Goldstein, and J.F. Hughes. Real–time nonphotorealistic rendering. SIGGRAPH 97 Conference Proceedings, pp. 415–420, 1997.

H. Nishimura, M. Hirai, T. Kawai, T. Kawata, I. Shirakawa, K. Omura. Object modeling by distribution function and a method of image generation. Transactions of the Institute of Electronics and Communication Engineers of Japan, J68–D(4): 718–725, 1985.

L. Markosian, J.M. Cohen, T. Crulli and J.F. Hughes. Skin: A Constructive Approach to Modeling Free–form Shapes. SIGGRAPH 99, to appear, 1999; pp. 393–400.

K. van Overveld and B. Wyvill. Polygon inflation for animated models: a method for the extrusion of arbitrary polygon meshes. Journal of Visualization and Computer Animation, 18: 3–16, 1997.

R. Pausch, T. Burnette, A.C. Capeheart, M.Conway, D. Cosgrove, R. DeLine, J. Durbin, R. Gossweiler, S. Koga, and J. White. Alice: Rapid prototyping system for virtual reality. IEEE Computer Graphics and Applications, 15(3): 8–11, May 1995.

L. Prasad. Morphological analysis of shapes. CNLS Newsletter, 139: 1–18, Jul. 1997.

J. R. Shewchuk. Triangle: engineering a 2D quality mesh generator and Delauny triangulator. First Workshop on Applied Computational Geometry Proceedings, pp. 203–222–133, 1996.

K. Singh and E. Fiume. Wires: a geometric deformation technique. SIGGRAPH 98 Conference Proceedings, pp. 405–414, 1998.

G. Taubin. A signal processing approach to fair surface design. SIGGRAPH 95 Conference Proceedings, pp. 351–358, 1995.

S.W. Wang and A.E. Kaufman, Volume sculpting. 1995 Symposium on Interactive 3D Graphics, pp. 151–156 and 214, 1995.

W. Welch and A. Witkin. Free–form shape design using triangulated surfaces. SIGGRAPH 94 Conference Proceedings, pp. 247–256, 1994.

L. Williams. Shading in Two Dimensions. Graphics Interface '91, pp. 143–151, 1991.

L. Williams, 3D Paint. 1990 Symposium on Interactive 3D Graphics, pp. 225–233, 1990.

R.C. Zeleznik, K.P. Herndon, and J.F. Hughes. SKETCH: An interface for sketching 3D scenes. SIGGRAPH 96 Conference Proceedings, pp. 163–170, 1996.

* cited by examiner

FIG. 2A

```
CREATING A NEW CLOSED POLYGONAL MESH MODEL FROM AN INITIAL STROKE
  1. CREATING A CLOSED PLANAR POLYGON BY CONNECTING THE
START-POINT AND END-POINT OF THE STROKE;
  2. MAKING EDGES OF POLYGON A PREDEFINED UNIT LENGTH WHEN AN
INITIAL CLOSED PLANAR POLYGON IS CONSTRUCTED;
  3. PERFORMING CONSTRAINED DELAUNAY TRIANGULATION OF SAID
POLYGON;
  4. DETERMINING THE SPINE AND/OR AXES OF THE POLYGON USING THE
CHORDAL AXIS.
```

↓

```
DETERMINING THE SPINE OF THE POLYGON USING THE CHORDAL AXIS
  1. CONNECTING MIDPOINTS OF INTERNAL EDGES OF TRIANGLES TO
OBTAIN THE CHORDAL AXIS;
  2. PRUNING INSIGNIFICANT BRANCHES OF THE CHORDAL AXIS TO OBTAIN
SAID SPINE;
  3. PERFORMING RETRIANGULATION OF MESH BY DIVIDING TRIANGLES IN
SAID POLYGON AT SAID SPINE SO THAT A COMPLETE 2D TRIANGULAR MESH
EXISTS BETWEEN SAID SPINE AND THE PERIMETER OF SAID POLYGON.
```

↓

```
ELEVATING VERTICES OF SAID SPINE BY AN AMOUNT PROPORTIONAL TO
THEIR DISTANCE FROM THE POLYGON
  1. ELEVATING EACH VERTEX OF SAID SPINE
PROPORTIONALLY TO THE AVERAGE DISTANCE BETWEEN THE VERTEX AND THE
EXTERNAL VERTICES THAT ARE DIRECTLY CONNECTED TO THE VERTEX;
  2. CONVERTING ,EXCLUDING SPINE EDGES, EACH INTERNAL EDGE OF
EACH FAN TRIANGLE TO A QUARTER OVAL.
```

↓

```
CONSTRUCTING A POLYGONAL MESH BY WRAPPING SAID SPINE AND SAID
POLYGON IN SUCH A WAY THAT SECTIONS FORM OVALS.
  1. CONSTRUCTING AN APPROPRIATE POLYGONAL MESH BY SEWING
TOGETHER THE NEIGHBORING ELEVATED EDGES;
  2. COPYING THE ELEVATED MESH TO THE OTHER SIDE TO MAKE THE MESH
CLOSED AND SYMMETRIC.
```

FIG. 2B

PRUNING

EXAMINING EACH TERMINAL TRIANGLE WHICH HAS TWO EXTERIOR EDGES AND ONE INTERIOR EDGE;

ERECTING A SEMICIRCLE WHOSE DIAMETER IS THE INTERIOR EDGE AND WHICH LIES ON THE SAME SIDE OF SAID EXTERIOR EDGES;

REMOVING SAID INTERIOR EDGE;

MERGING SAID TERMINAL TRIANGLE WITH TRIANGLE THAT LIES ON THE OTHER SIDE OF SAID EXTERIOR EDGES IF ALL THREE VERTICES OF SAID TERMINAL TRIANGLE LIE ON AND/OR WITHIN SAID SEMICIRCLE;

REPEATING SAID ERECTING STEP, SAID REMOVING STEP AND SAID MERGING STEP UNTIL SOME VERTEX LIES OUTSIDE SAID SEMICIRCLE
(UNTIL NEWLY MERGED TRIANGLE IS A JUNCTION TRIANGLE);

TRIANGULATING THE MERGED TRIANGLE WITH A FAN OF TRIANGLES RADIATING FROM THE MIDPOINT OF INTERIOR EDGE
(WITH A FAN FROM THE MIDPOINTS OF THE JUNCTION TRIANGLE);

OBTAINING PRUNED SPINE BY CONNECTIEG THE MIDPOINTS OF REMAINING TRIANGLES' INTERNAL EDGES.

FIG. 2D

EXTRUSION

FINDING A PLANE FOR PROJECTION, SAID PLANE PASSING THROUGH CENTER OF GRAVITY OF A CLOSED BASE RING ON AN OBJECT AND LYING PARALLEL TO THE NORMAL OF SAID BASE RING;

↓

CREATING COPIES OF SAID BASE RING ALONG AN EXTRUDING STROKE IN SUCH A WAY AS TO BE ALMOST PERPENDICULAR TO THE DIRECTION OF THE EXTRUSION;

↓

RESIZING SAID COPIES TO FIT WITHIN THE STROKE BY ADVANCING LEFT AND RIGHT POINTERS ALONG THE EXTRUDING STROKE STARTING FROM BOTH ENDS;

↓

DELETING ORIGINAL POLYGONS SURROUNDED BY SAID BASE RING;

↓

CREATING NEW POLYGONS BY SEWING THE NEIGHBORING COPIES OF SAID BASE RING TOGETHER.

FIG. 2E

CUTTING

PROJECTING EACH LINE SEGMENT OF CUTTING STROKE ONTO THE FRONT AND BACK FACING POLYGONS

↓

CONNECTING CORRESPONDING END POINTS OF THE PROJECTED EDGES TO CONSTRUCT A PLANER POLYGON

↓

TRIANGULATING EACH PLANER POLYGON

↓

REMOVING POLYGONS TO ONE SIDE OF THE CUTTING STROKE

SMOOTHING

DELETING POLYGONS SURROUNDED BY A CLOSED
SURFACE RING ON OBJECT

CREATING NEW POLYGONS TO COVER HOLE MADE BY
SAID DELETING STEP SMOOTHLY

FIG. 2G

SMOOTHING

TRANSLATING OBJECT INTO A COORDINATE SYSTEM WHOSE Z-AXIS IS PARALLEL TO THE NORMAL OF A CLOSED SURFACE RING ON SAID OBJECT;

↓

CREATING A 2D POLYGON BY PROJECTING SAID RING ONTO XY-PLANE IN NEWLY CREATED COORDINATE SYSTEM;

↓

TRIANGULATING THE POLYGON TO CREATE A CONSTRAINED DELAUNAY TRIANGULATION AND GRADUALLY REFINE THE MESH BY EDGE SPLITTING AND FLIPPING;

↓

SETTING, FOR EACH EDGE OF THE RING, A PLANE THAT PASSES THROUGH THE VERTEX AND THE MIDPOINT OF THE EDGE AND IS PARALLEL TO THE Z-AXIS;

↓

CALCULATING THE z-VALUE OF THE VERTEX SO THAT IT LIES ON THE 2D BEZIER CURVE THAT SMOOTHLY INTERPOLATES BOTH ENDS OF THE RING ON THE PLANE;

↓

ELEVATING EACH VERTEX ALONG THE Z-AXIS TO THE z-VALUE TO CREATE A SMOOTH 3D SURFACE.

↓

APPLYING A SURFACE-FAIRING ALGORITHM TO NEWLY CREATED POLYGONS TO ENHANCE SMOOTHNESS.

FIG.3A
INITIAL STATE
FIG.3B
INPUT STROKE
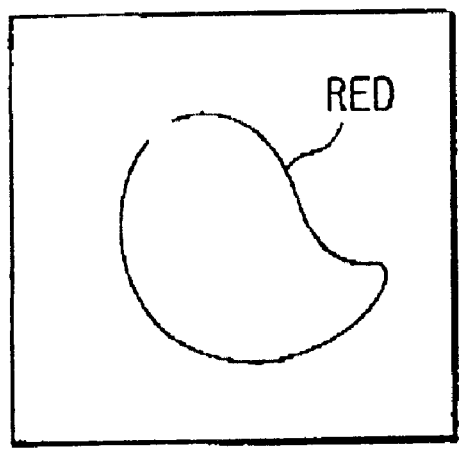
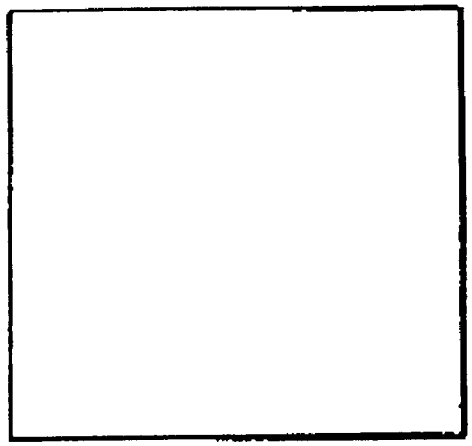
FIG.3C
RESULT OF CREATION
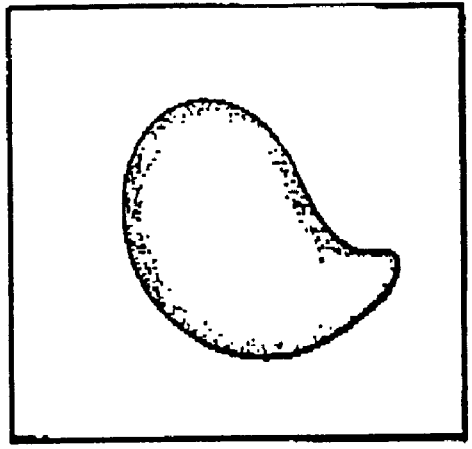
FIG.3D
ROTATED VIEW
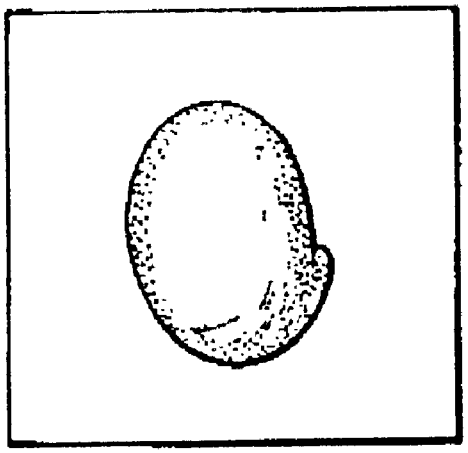

PAINTING STROKE  RESULT OF PAINTING  ROTATED VIEW

BEFORE EXTRUSION

CLOSED STROKE

ROTATED VIEW

EXTRUDING STROKE

RESULT OF EXTRUSION

ROTATED VIEW

BEFORE CUTTING

CUTTING STROKE

RESULT OF CUTTING

RESULT OF CLICK

EXTRUSION AFTER CUTTING

RESULT OF EXTRUSION

ROTATED VIEW

BEFORE ERASING

SCRIBBLING

RESULT OF ERASING

CLOSED STROKE

SCRIBBLING

RESULT OF SMOOTHING

ROTATED VIEW

FIG.5A  FIG.5B
SNAKE  SNAIL
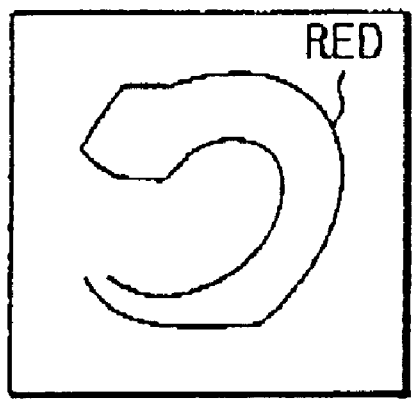
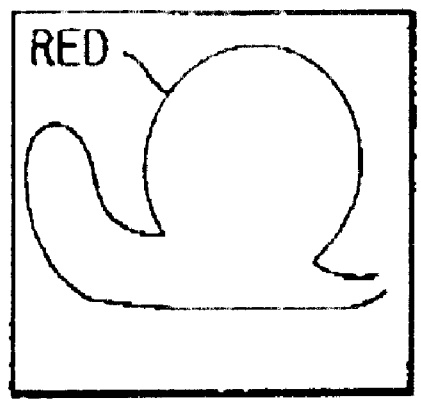
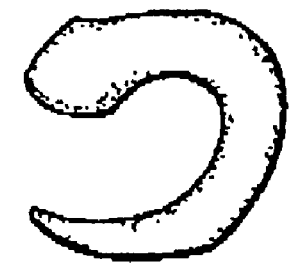
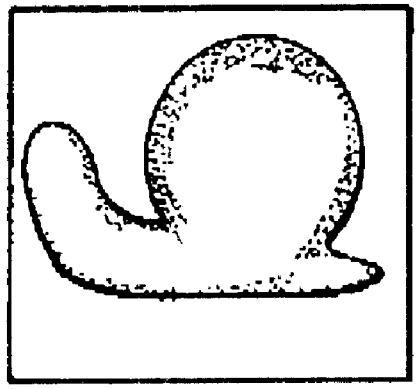
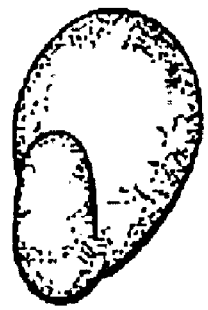

FIG.5C  FIG.5D
CHERRY    MUSCULAR ARM
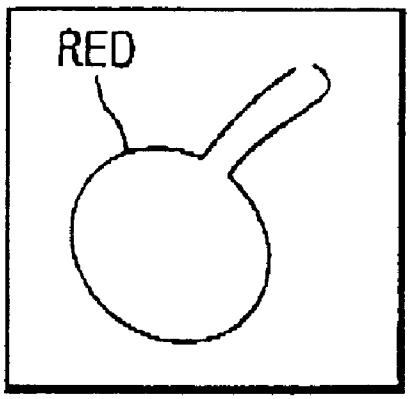 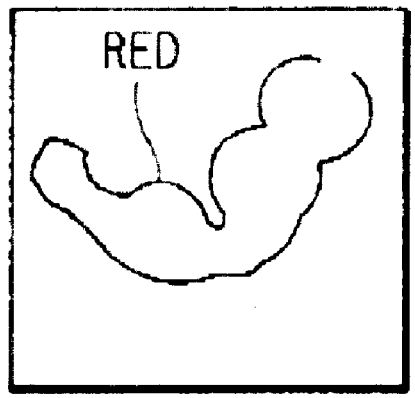
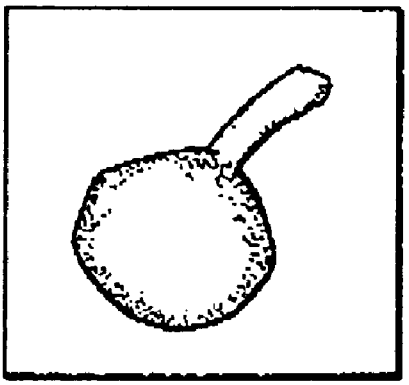 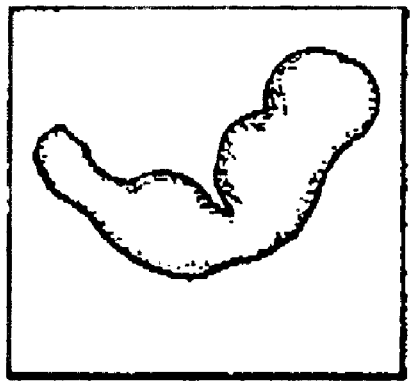
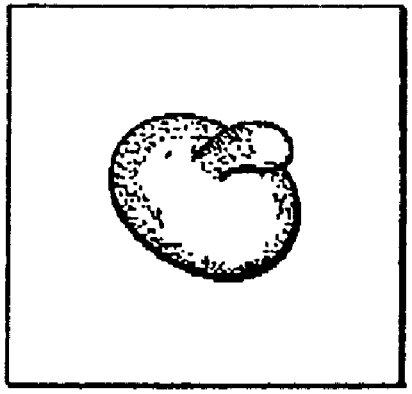 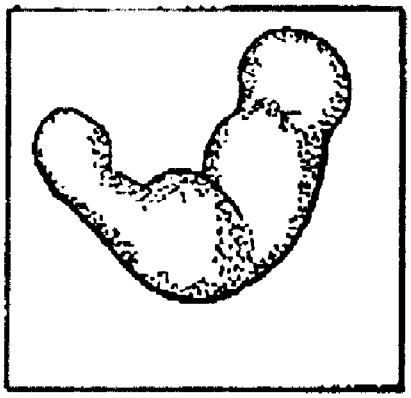

FIG.6A
LONG
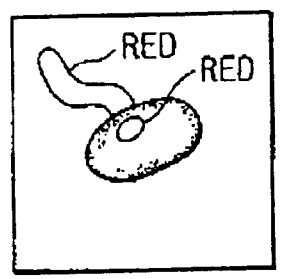
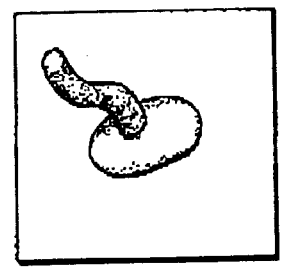
FIG.6B
THIN
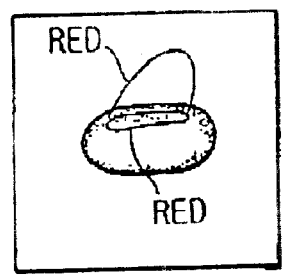
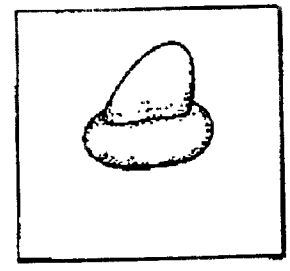
FIG.6C
FAT
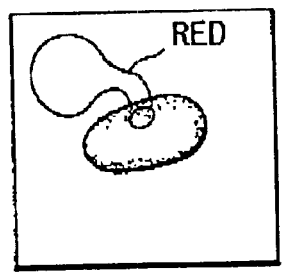
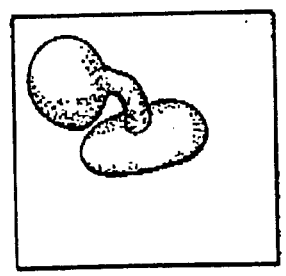
FIG.6D
SHARP
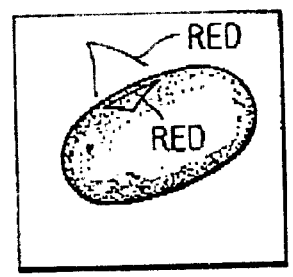
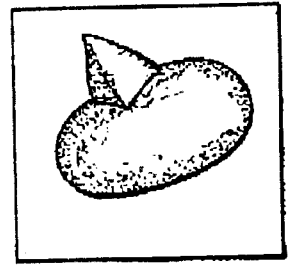

FIG.7A  FIG.7B  FIG.7C
DIGGING STROKE   RESULT   ROTATED
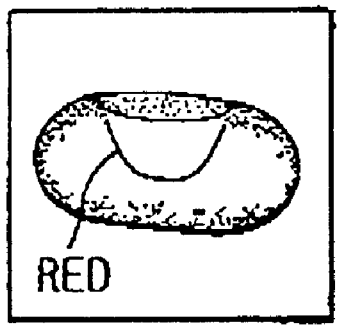 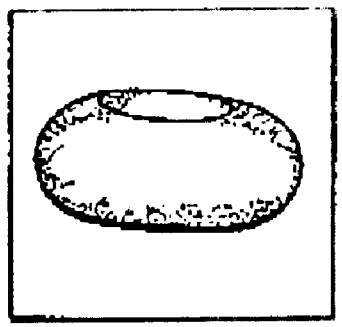 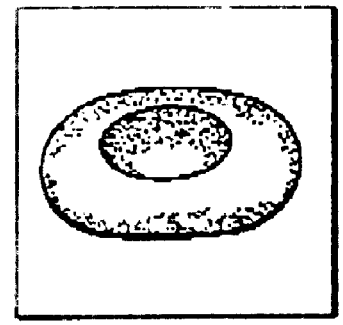
FIG.7D  FIG.7E
CLOSED STROKE   AFTER CLICK
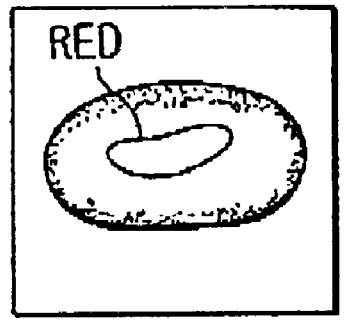 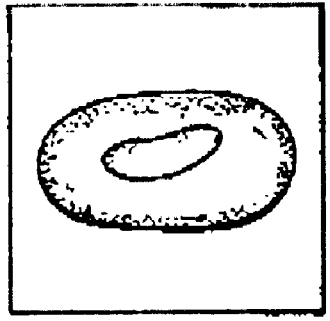

BITING STROKE

RESULT

ROTATED VIEW

AFTER CLICK

FIG.9A  FIG.9B
CUTTING STROKE    RESULT
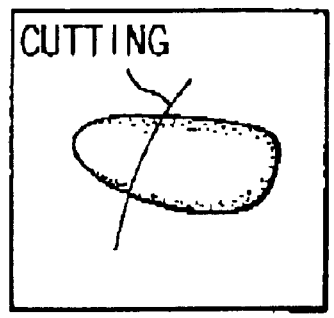
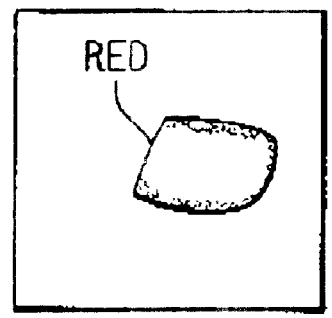
FIG.9C  FIG.9D  FIG.9E
ROTATED    EXTRUDING STROKE    RESULT
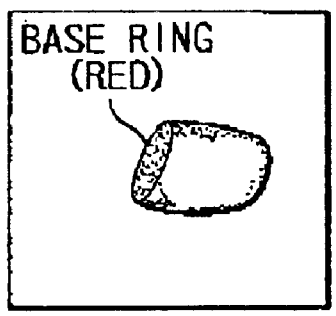
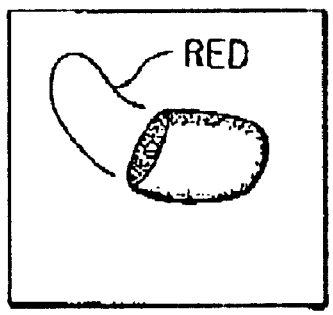
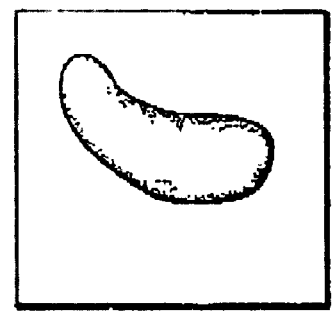

CLEANING A CAVITY

SMOOTHING A SHARP EDGE

ORIGINAL  REFERENCE STROKE  TARGET STROKE  RESULT  ROTATED

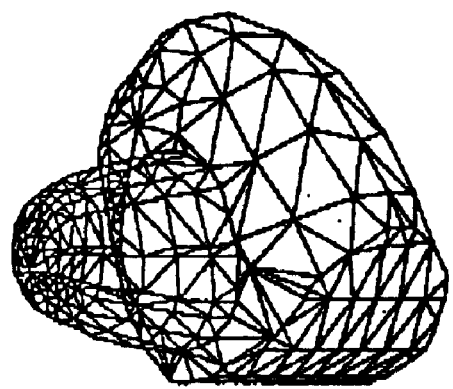
FIG.12A AFTER CREATION
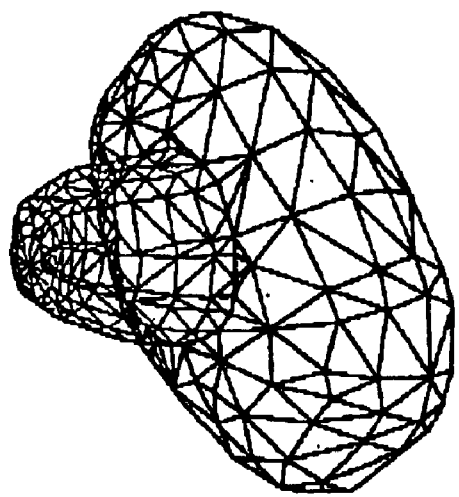
FIG.12B AFTER EXTRUSION
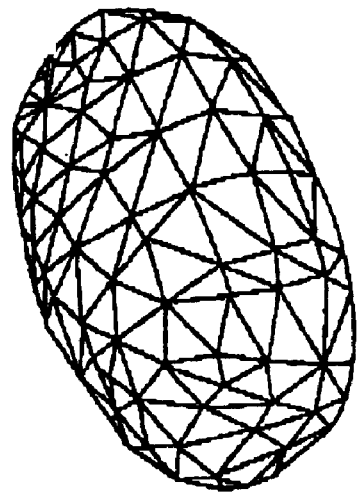
FIG.12C AFTER CUTTING

CHORDAL AXIS

FINAL TRIANGULATION

RESULT OF CDT

RESULTING SPINE

INITIAL 2D POLYGON

FAN TRIANGLES

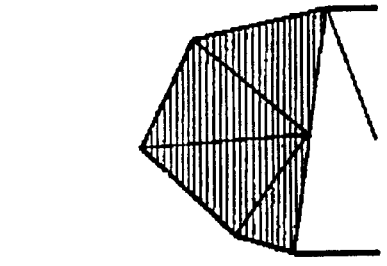
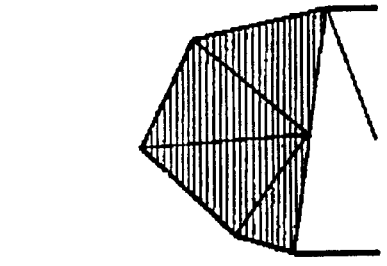
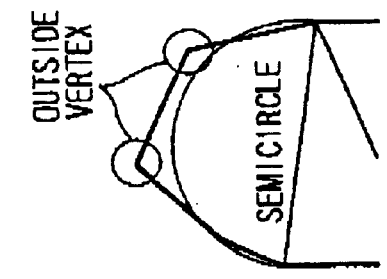
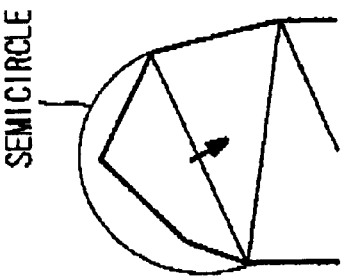
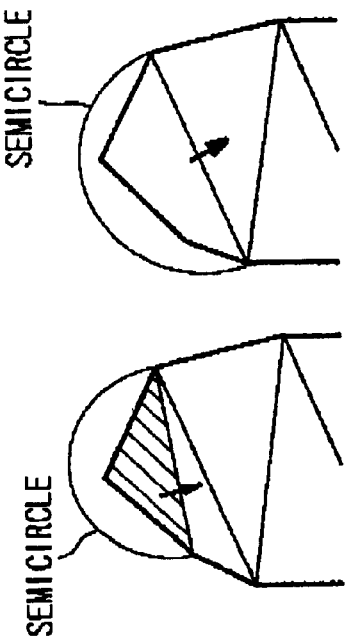
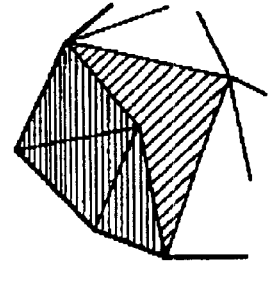
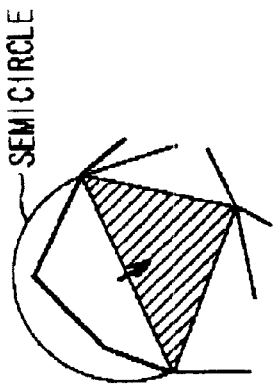
FIG. 14A START FROM T-TRIANGLE
FIG. 14B ADVANCE
FIG. 14C STOP
FIG. 14D FAN TRIANGLES
FIG. 14E ADVANCE TO J-TRIANGLE
FIG. 14F FAN TRIANGLES AT J-TRIANGLE

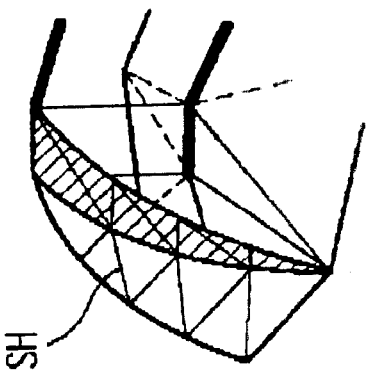
FIG. 15D  SEW ELEVATED EDGES  POLYGONAL MESH
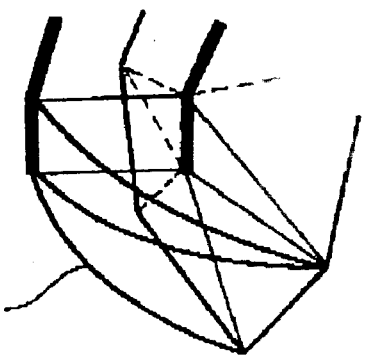
FIG. 15C  ELEVATE EDGES  QUARTER OVAL
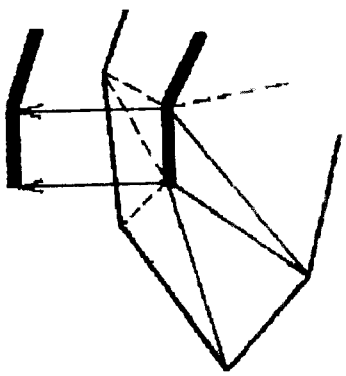
FIG. 15B  ELEVATE SPINES
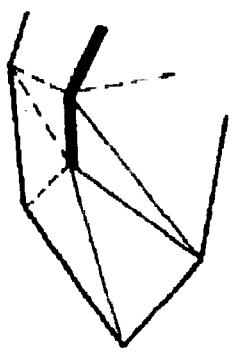
FIG. 15A  BEFORE

PROJECTION OF THE STROKE

SWEEP ALONG THE PROJECTED STROKE

SEWING ADJACENT RINGS

POINTER ADVANCING

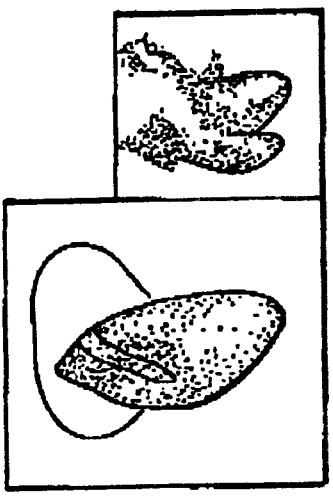
FIG. 19C WRAPPING EXTRUSION
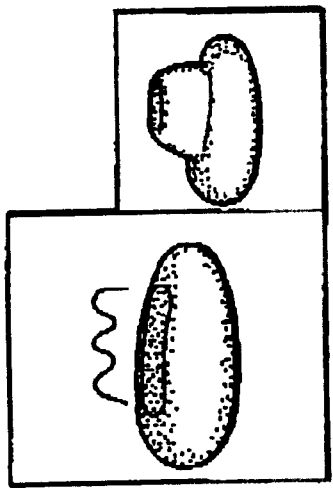
FIG. 19B WAVY EXTRUSION
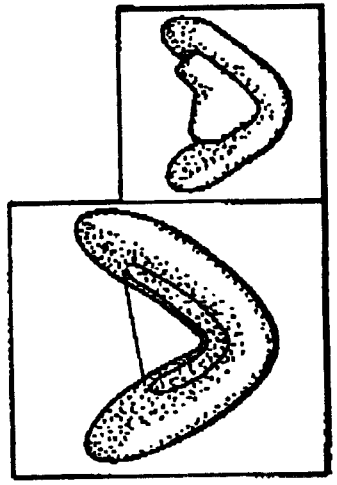
FIG. 19A FLAT EXTRUSION

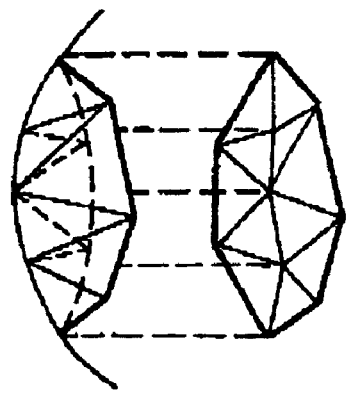
FIG. 21A  BEFORE
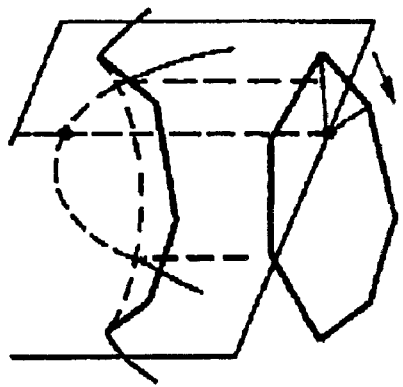
FIG. 21B  TRIANGULATION
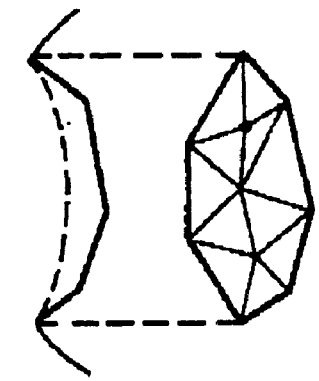
FIG. 21C  CALCULATING Z-VALUE
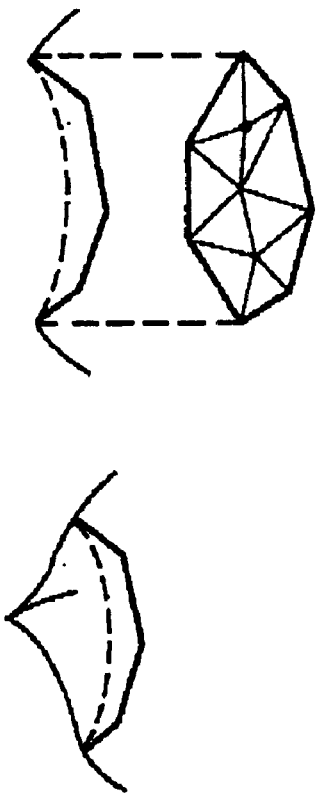
FIG. 21D  RESULT

METHOD FOR CONSTRUCTING A 3D POLYGONAL SURFACE FROM A 2D SILHOUETTE BY USING COMPUTER, APPARATUS THEREOF AND STORAGE MEDIUM

This non-provisional patent application claims priority from U.S. Provisional Application No. 60/167,191, filed Nov. 23, 1999.

BACKGROUND OF THE INVENTION

1. Field of the Invention

This invention relates to method and apparatus for constructing a 3D polygonal surface from a 2D silhouette by using computer. This invention relates to method and system for providing a sketching interface for 3D freeform design.

2. Description of the Related Art

A typical procedure for geometric modeling is to start with a simple primitive such as a cube or a sphere, and gradually construct a more complex model through successive transformations or a combination of multiple primitives. Various deformation techniques (R. MacCracken and K. I. Joy. Free-form deformations with lattices of arbitrary topology. SIGGRAPH 96 Conference Proceedings, pages 181–188, 1996.)(K. Singh and E. Fiume. Wires: a geometric deformation technique. SIGGRAPH 98 Conference Proceedings, pages 405–414, 1998.) and other shape-manipulation tools (C. Grimm, D. Pugmire, M. Bloomental, J. F. Hughes, and E. Cohen. Visual interfaces for solids modeling. UIST '95 Conference Proceedings, pages 51–60, 1995.) are examples of transformation techniques that let the user create a wide variety of precise, smooth shapes by interactively manipulating control points or 3D widgets.

Another approach to geometric modeling is the use of implicit surfaces (J. Bloomenthal and B. Wyvill. Interactive techniques for implicit modeling. 1990 Symposium on Interactive 3D Graphics, pages 109–116, 1990.)(L. Markosian, J. M. Cohen, T. Crulli and J. F. Hughes. Skin: A Constructive Approach to Modeling Free-form Shapes. SIGGRAPH 99, to appear, 1999.) The user specifies the skeleton of the intended model and the system constructs smooth, natural-looking surfaces around it. The surface inflation technique (H. Nishimura, M. Hirai, T. Kawai, T. Kawata, I. Shirakawa, K. Omura. Object modeling by distribution function and a method of image generation. Transactions of the Institute of Electronics and Communication Engineers of Japan, J68-D (4):718–725, 1985) extrudes the polygonal mesh from the skeleton outwards. In contrast, the user can also specify the silhouette of the intended shape directly instead of by specifying its skeleton.

Some modeling systems achieve intuitive, efficient operation using 3D input/output devices (M. Deering. The Holosketch VR sketching system. Communications of the ACM, 39(5):54–61, May 1996.). 3D devices can simplify the operations that require multiple operations when using 2D devices.

Known sketch-based modeling systems are L. Eggli, C. Hsu, G. Elber, and B. Bruderlin, Inferring 3D models from freehand sketches and constraints. Computer-Aided Design, 29(2): 101–112, February 1997. and R. C. Zeleznik, K. P. Herndon, and J. F. Hughes. SKETCH: An interface for sketching 3D scenes. SIGGRAPH 96 Confetence Proceedings, pages 163–170, 1996. They interpret the user's freeform strokes and interactively construct 3D rectilinear models. It is an aim to develop a similar interface for designing rounded freeform models.

Inflation of a 2D drawing is introduced in L. Williams. Shading in Two Dimensions. Graphics Interface '91, pages 143–151, 1991, and 3D surface editing based on a 2D painting technique is discussed in L. Williams. 3D Paint. 1990 Symposium on Interactive 3D Graphics, pages 225–233, 1990.

Their target is basically a 2D array with associated height values, rather than a 3D polygonal model.

The use of freeform strokes for 2D applications has recently become popular. Some systems (M. D. Gross and E. Y. L. Do. Ambiguous intentions: A paper-like interface for creative design. UIST'96 Conference Proceedings, pages 183–192, 1996.)(J. A. Landay and B. A. Myers. Interactive sketching for the early stages of user interface design. CHI'95 Conference Proceedings, pages 43–50, 1995.) use strokes to specify gestural commands and others (T. Baudel. A mark-based interaction paradigm for free-hand drawing. UIST'94 Conference Proceedings, pages 185–192, 1994.) use freeform strokes for specifying 2D curves. These systems find the best matching arcs or splines automatically, freeing the users from explicit control of underlying parameters.

Some systems use a volumetric representation (T. Galyean and J. F. Hughes. Sculpting: an interactive volumetric modeling technique. SIGGRAPH '91 Conference Proceedings, pages 267–274, 1991.)(S. W. Wang and A. E. Kaufman, volume sculpting. 1995 Symposium on Interactive 3D Graphics, pages 109–116, 1995.), which is useful for designing topologically complicated shapes. The mesh-construction algorithm according to the present invention is based on a variety of work on polygonal mesh manipulation, such as mesh optimization (H. Hoppe, T. DeRose, T. Duchamp, J. McDonald, and W. Stuetzle. Mesh optimization. SIGGRAPH 93 Conference Proceedings, pages 19–26, 1993.), shape design (W. Welch and A. Witkin. Free-form shape design using triangulated surfaces. SIGGRAPH 94 Conference Proceedings, pages 247–256, 1994.), and surface fairing (G. Taubin. A signal processing approach to fair surface design. SIGGRAPH 95 Conference Proceedings, pages 351–358, 1995.), which allows polygonal meshes to be widely used as a fundamental representation for geometric modeling and computer graphics in general.

Although much progress has been made over the years on 3D modeling systems, they are still difficult and tedious to use when creating freeform surfaces. Their emphasis has been the precise modeling of objects motivated by CAD and similar domains. Recently SKETCH (R. C. Zelezmk, K. P. Herndon, and J. F. Hughes. SKETCH: An interface for sketching 3D scenes. SIGGRAPH 96 Conference Proceedings, pages 163–170, 1996.) introduced a gesture-based interface for the rapid modeling of CSG-like models consisting of simple primitives.

SUMMARY OF THE INVENTION

The present invention extends these ideas to create a sketching interface for designing 3D freeform objects. The essential idea is the use of freeform strokes as an expressive design tool. The user draws 2D freeform strokes interactively specifying the silhouette of an object, and the system automatically constructs a 3D polygonal surface model based on the strokes. The user does not have to manipulate control points or combine complicated editing operations. Using this technique, even first-time users can create simple, yet expressive 3D models within minutes. In addition, the resulting models have a hand-crafted feel (such as sculptures and stuffed animals) which is difficult to accomplish with most conventional modelers.

The present invention is method for constructing a 3D polygonal surface from a 2D silhouette by using computer, comprising the steps of: creating a new closed polygonal mesh model from an initial stroke; determining the spine of the polygon using the chordal axis; elevating vertices of said spine by an amount proportional to their distance from the polygon; constructing a polygonal mesh by wrapping said spine and said polygon in such a way that sections form ovals.

The present invention is apparatus for constructing a 3D polygonal surface from a 2D silhouette, comprising: a first section for creating a new closed polygonal mesh model from an initial stroke; a second section for determining the spine of the polygon using the chordal axis; a third section for elevating vertices of said spine by an amount proportional to their distance from the polygon; a forth section for constructing a polygonal mesh by wrapping said spine and said polygon in such a way that sections form ovals.

The present invention is a medium recording a program for constructing a 3D polygonal surface from a 2D silhouette, which creates a new closed polygonal mesh model from an initial stroke; determines the spine of the polygon using the chordal axis; elevates vertices of said spine by an amount proportional to their distance from the polygon; constructs a polygonal mesh by wrapping said spine and said polygon in such a way that sections form ovals.

Medium includes, for example, a floppy disk, a hard disk, a magnetic tape, a magneto optical disk, a CD-ROM, a DVD, a ROM cartridge, a RAM memory cartridge with a backup battery, a flash memory cartridge and a non-volatile RAM cartridge.

Medium also includes such wire communication medium as telephone lines, and such wireless communication medium as microwave lines. Internet is also included in the communication medium mentioned here.

Medium is a material substance where information (mainly digital data, programs) have been recorded by some physical means, so that such a processing device as a dedicated processor can execute predetermined functions. A medium is for downloading programs to a computer and having the computer execute predetermined functions by some means.

BRIEF DESCRIPTION OF THE DRAWINGS

FIGS. 2A–2G are flowcharts of this invention.

FIG. 5 including FIGS. 5A–5D is Examples of creation (top: input stroke, middle: result of creation, bottom: rotated view)

FIG. 6 including FIGS. 6A–6D is examples of extrusion (top: extruding stroke, bottom: result of extrusion)

FIG. 7 including FIGS. 7A–7E is more extrusion operations: digging a cavity (a–c) and turning the closed stroke into a surface drawing (d–e).

FIG. 8 including

FIG. 9 including FIGS. 9A–9E is extrusion after cutting.

FIG. 10 including

FIG. 11 including

FIG. 12 including FIGS. 12A–12C is internal representation.

FIG. 14 including FIGS. 14A–14F explains the process of pruning.

FIG. 15 including FIGS. 15A–15D is polygonal mesh construction.

FIG. 19 including FIGS. 19A–19C is unintuitive extrusions.

FIG. 21 including FIGS. 21A–21D explains the process of smoothing algorithm.

DESCRIPTION OF THE PREFERRED EMBODIMENTS

Figure 1:
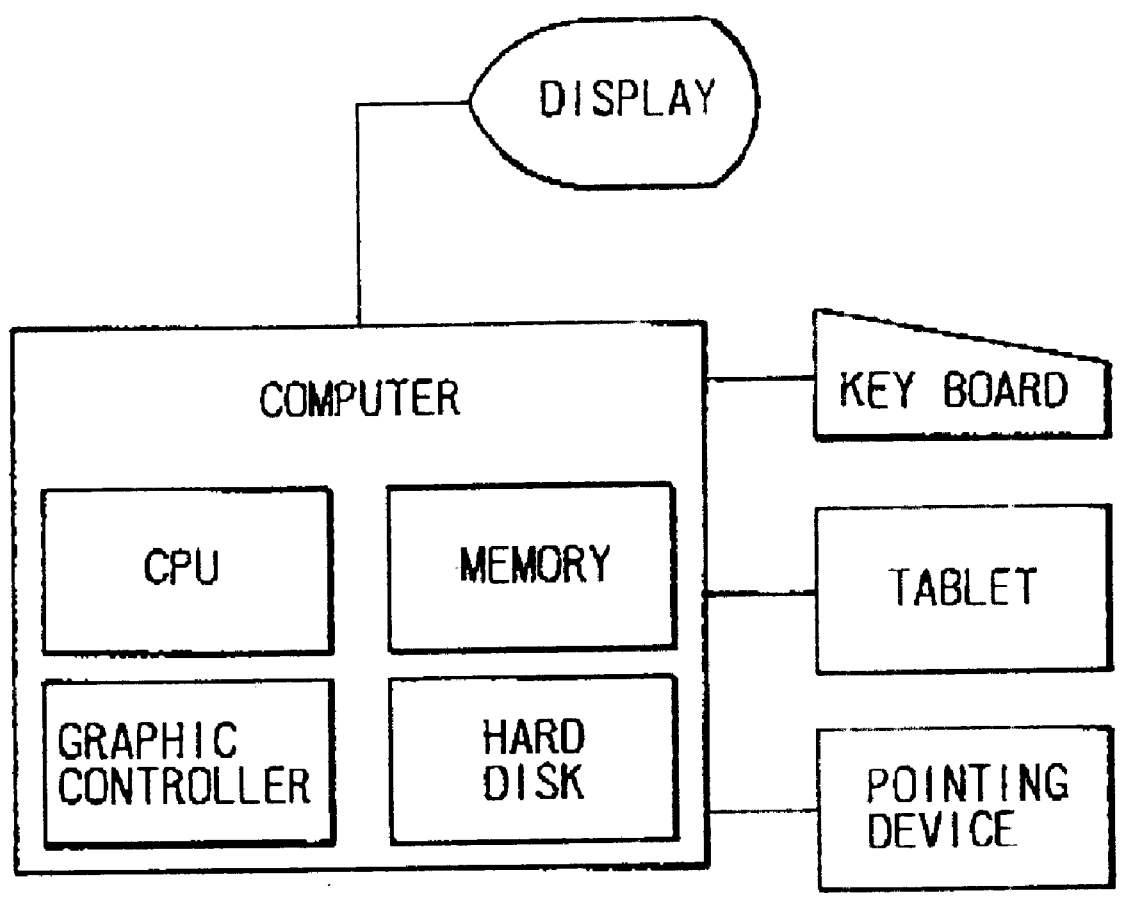
FIG. 1 is a block diagram of a computer in which a program for performing process of this invention is installed.
Figure 2C:
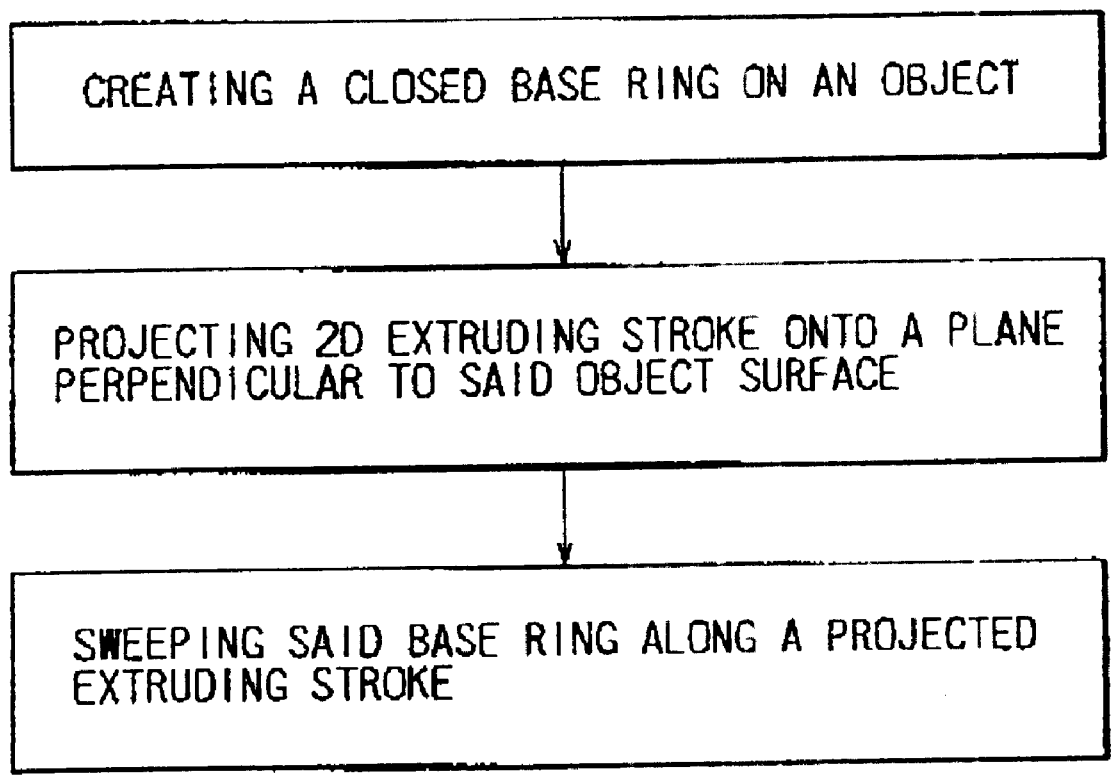
Figure 2F:

Now, the sketching interface and the algorithms for constructing 3D shapes from 2D strokes will be described. Also described is the implementation of a prototype system Teddy. The geometric representation used is a standard polygonal mesh to allow the use of numerous software resources for post-manipulation and rendering. However, the interface itself can be used to create other representations such as volumes (S. W. Wang and A. E. Kaufman, Volume sculpting. 1995 Symposium on Interactive 3D Graphics, pages 109–116, 1995.) or metaballs (H. Nishimura, M. Hirai, T. Kawai, T. Kawata, I. Shirakawa, K. Omura. Object modeling by distribution function and a method of image generation. Transactions of the Institute of Electronics and Communication Engineers of Japan, J68-D(4):718–725, 1985).

Like SKETCH (R. C. Zeleznik, K. P. Herndon, and J. F. Hughes. SKETCH: An interface for sketching 3D scenes. SIGGRAPH 96 Conference Proceedings, pages 163–170, 1996.), this system is designed for the rapid construction of approximate models, not for the careful editing of precise models. To emphasize this design goal and encourage creative exploration, the real-time pen-and-ink rendering described in L. Markosian, M. A. Kowalski, S. J. Trychin, L. D. Bourdev, D. Goldstein, and J. F. Hughes. Real-time nonphotorealistic rendering. SIGGRAPH 97 conference Proceedings, pages 415–420, 1997, is used. This also allows real-time interactive rendering using Java on mid-range PCs without dedicated 3D rendering hardware.

An obvious application of this system is the design of 3D models for character animation. However, in addition to augmenting traditional 3D modelers, this system's ease of use has the potential to open up new application areas for 3D modeling. Possibilities include rapid prototyping in the early stages of design, educational/recreational use for non-professionals and children, and real-time communication assistance on pen-based systems.

3 USER INTERFACE

This system's physical user interface is based upon traditional 2D input devices such as a standard mouse or tablet. A two-button mouse with no modifier keys is used. unlike traditional modeling systems, this system does not use WIMP-style direct manipulation techniques or standard interface widgets such as buttons and menus for modeling operations. Instead, the user specifies his or her desired operation using freeform strokes on the screen, and the system infers the user's intent and executes the appropriate editing operations.

In addition to gestures, this system supports direct camera manipulation using the secondary mouse button based on a virtual trackball model (J. Hultquist. A virtual trackball. Graphics Gems (ed. A. Glassner). Academic Press, pages 462–463, 1990.). Also used are a few button widgets for auxiliary operations, such as save and load, and for initiating bending operations.

4 MODELING OPERATIONS

This section describes this system's modeling operations from the user's point of view; details of the algorithms are described later. Some operations are executed immediately after the user completes a stroke, while some require multiple strokes. The current system supports neither the creation of multiple objects at once, nor operations to combine single objects. Additionally, models must have a spherical topology; e.g., the user cannot create a torus. An overview of the model construction process is given first, and then each operation is described in detail.

The modeling operations are carefully designed to allow incremental learning by novice users. Users can create a variety of models by learning only the first operation (creation), and can incrementally expand their vocabulary by learning other operations as necessary. It is found helpful to restrict first-time users to the first three basic operations (creation, painting, and extrusion), and then to introduce other advanced operations after these basic operations are mastered.

4.1 Overview

FIG. 3 introduces this system's general model construction process. The user begins by drawing a single freeform stroke on a blank canvas (FIGS. 3a–b). As soon as the user finishes drawing the stroke, the system automatically constructs a corresponding 3D shape (c). The user can now view the model from a different direction (d). Once a model is created, it may be modified using, various operations. The user can draw a line on the surface (e–g) by drawing a stroke within the model silhouette. If the stroke is closed, the resulting surface line turns red and the system enters "extrusion mode" (h–i). Then the user rotates the model (j) and draws the second stroke specifying the silhouette of the extruded surface (k–m). A stroke that crosses the silhouette cuts the model (n–o) and turns the cut section red (p). The user either clicks to complete the operation (q) or draws a silhouette to extrude the section (r–t). Scribbling on the surface erases the line segments on the surface (u–w). If the user scribbles during the extrusion mode (x–y), the system smoothes the area surrounded by the closed red line (z–z').

Figure 4:
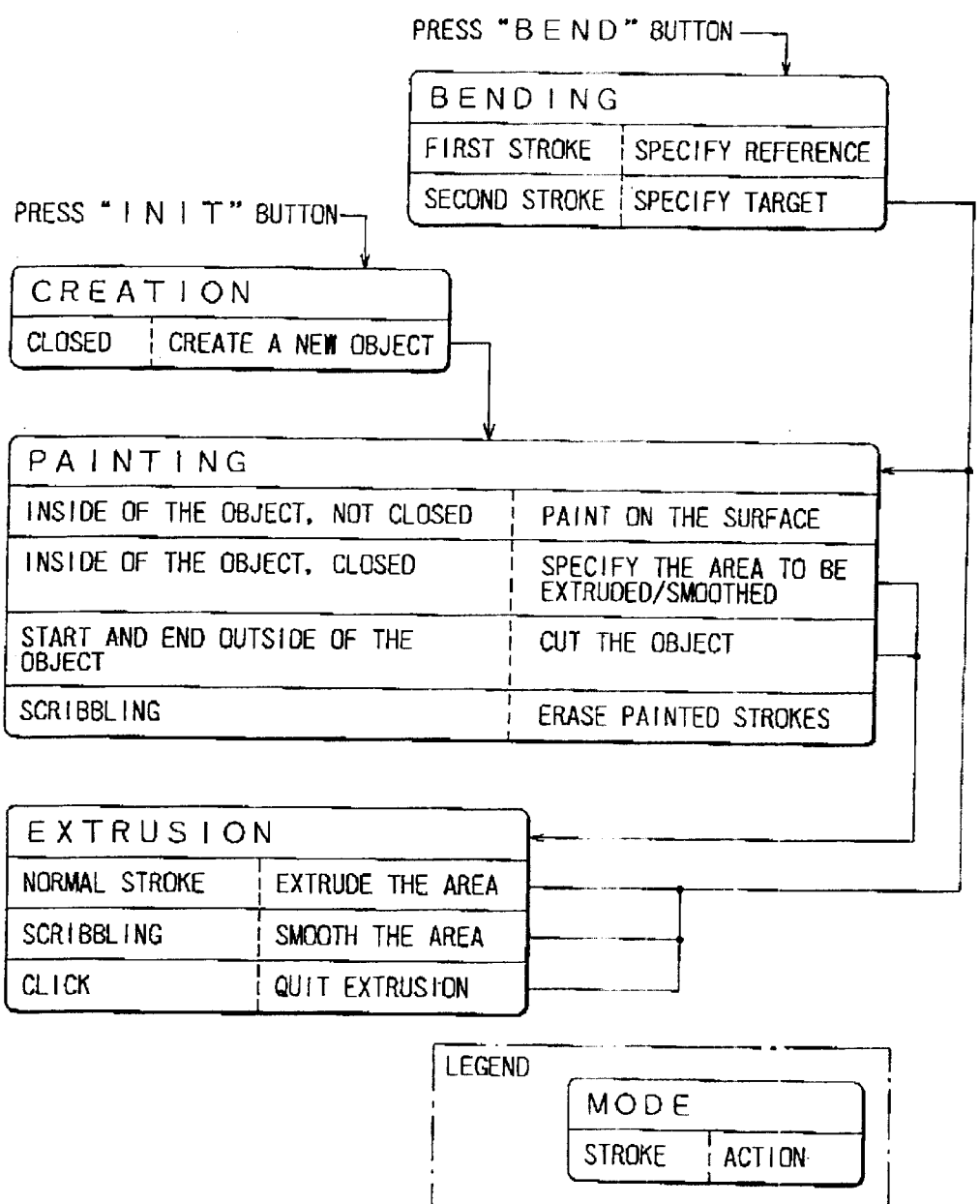
FIG. 4 is summary of the gestural operations.
Figure 8A:
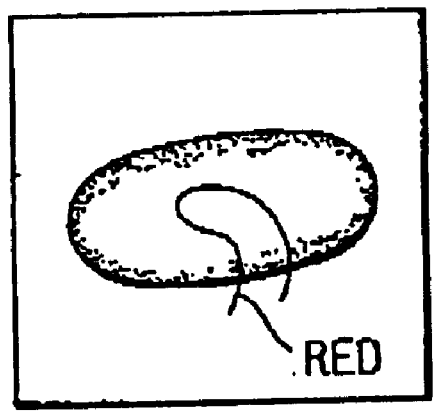
FIGS. 8A–8D is cutting operation.
Figure 8B:
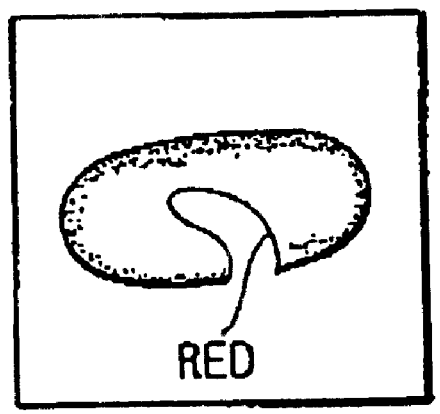
Figure 8C:
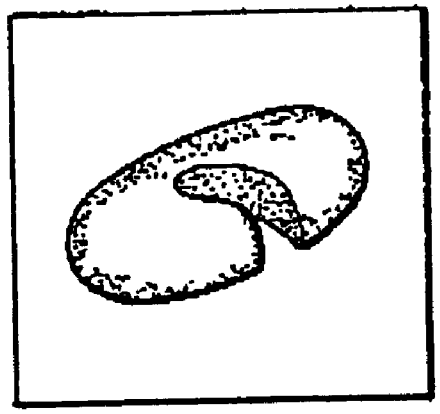
Figure 8D:
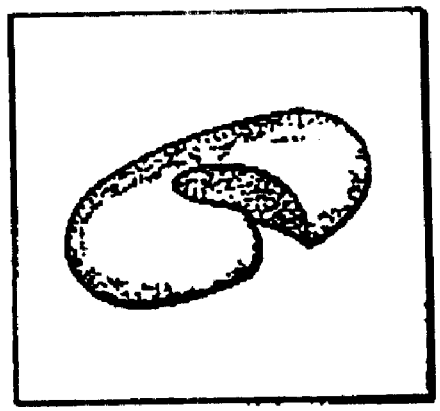

FIG. 4 summarizes the modeling operations available on this embodiment. The appropriate action is chosen based on the stroke's position and shape, as well as the current mode of the system.

4.2 Creating a New Object

Starting with a blank canvas, the user creates a new object by drawing its silhouette as a closed freeform stroke. The system automatically constructs a 3D shape based on the 2D silhouette. FIG. 5 shows examples of input strokes and the corresponding 3D models. The start point and end point of the stroke are automatically connected, and the operation fails if the stroke is self-intersecting. The algorithm to calculate the 3D shape is described in detail in section 5. Briefly, the system inflates the closed region in both directions with the amount depending on the width of the region: that is, wide areas become fat, and narrow areas become thin. Experience so far shows that this algorithm generates a reasonable-looking freeform shape. In addition to the creation operation, the user can begin model construction by loading a simple primitive. This embodiment provides a cube and a sphere, but adding more shapes is straightforward.

4.3 Painting and Erasing on the Surface

Figure 3E:
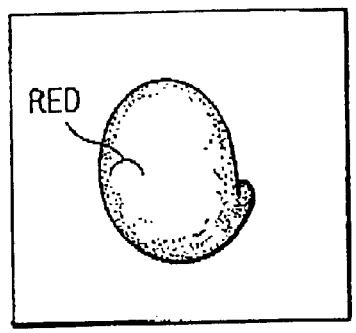
FIG. 3 including FIGS. 3A–3Z' is overview of the modeling operations.
Figure 3F:
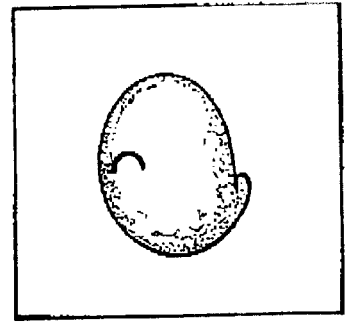
Figure 3G:
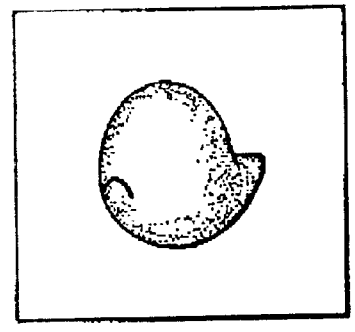
Figure 3H:
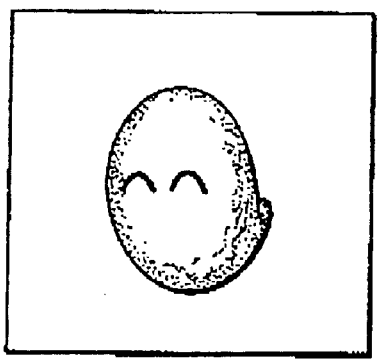
Figure 3I:
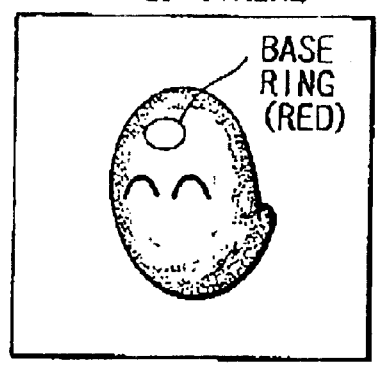
Figure 3J:
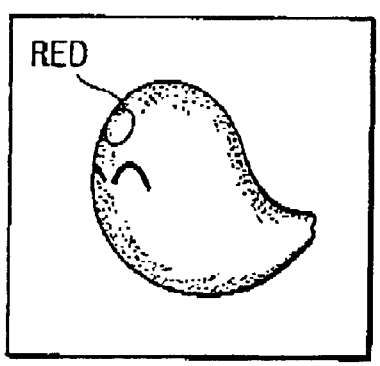
Figure 3K:
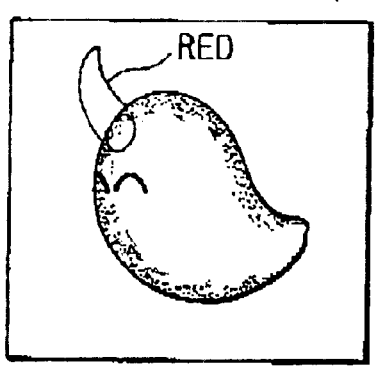
Figure 3L:
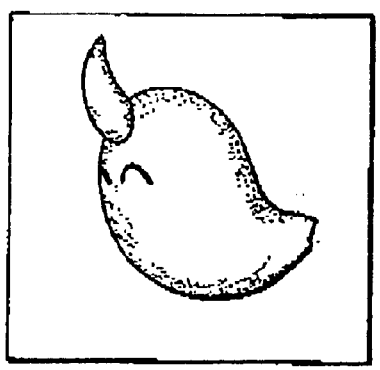
Figure 3M:
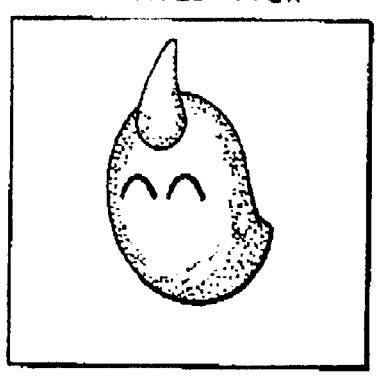
Figure 3N:
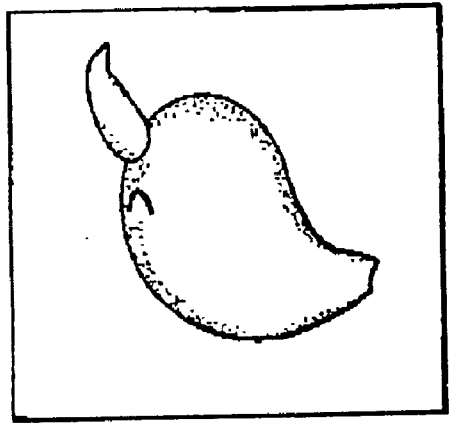

The object surface is painted by drawing a freeform stroke within the object's silhouette on the canvas (the stroke must not cross the silhouette) (P. Hanrahan, P. Haeberli, Direct WYSIWYG Painting and Texturing on 3D Shapes, SIGGRAPH 90 Conference Proceedings, pages 215–224, 1990.). The 2D stroke is projected onto the object surface as 3D line segments, called surface lines (FIGS. 3e–g). The user can erase these surface lines by drawing a scribbling stroke 1 (FIGS. 3u–w). This painting operation does not modify the 3D geometry of the model, but lets the user express ideas quickly and conveniently when using this system as a communication medium or design tool.

A stroke is recognized as scribbling when $sl/pl>1.5$, where sl is the length of the stroke and pl is the perimeter of its convex hull.

4.4 Extrusion

Extrusion is a two-stroke operation: a closed stroke on the surface and a stroke depicting the silhouette of the extruded surface. When the user draws a closed stroke on the object surface, the system highlights the corresponding surface line in red, indicating the initiation of "extrusion mode" (FIG. 3i). The user then rotates the model to bring the red surface line sideways (FIG. 3j) and draws a silhouette line to extrude the surface (FIG. 3k). This is basically a sweep operation that constructs the 3D shape by moving the closed surface line along the skeleton of the silhouette (FIGS. 3l–m). The direction of extrusion is always perpendicular to the object surface, not parallel to the screen. Users can create a wide variety of shapes using this operation, as shown in FIG. 6. They can also make a cavity on the surface by drawing an inward silhouette (FIGS. 7a–c). This embodiment does not support holes that completely extend to the other side of the object. If the user decides not to extrude, a single click turns the red stroke into an ordinary painted stroke (FIGS. 7d–e).

4.5 Cutting

Figure 3O:
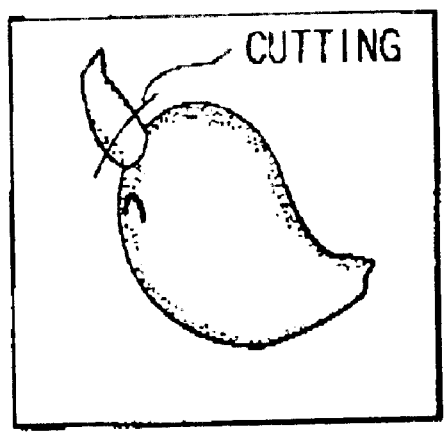
Figure 3P:
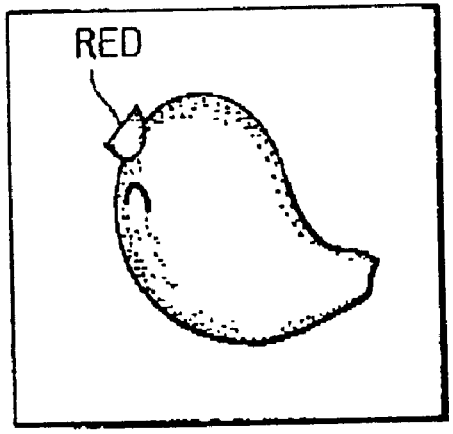
Figure 3Q:
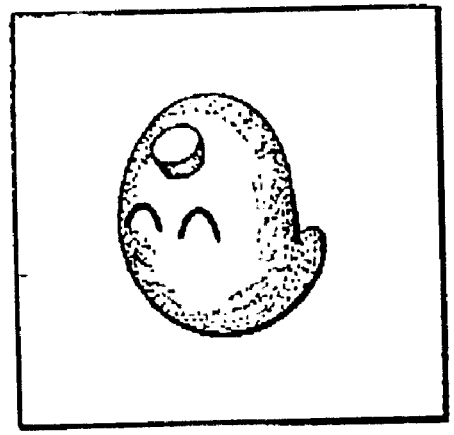
Figure 3R:
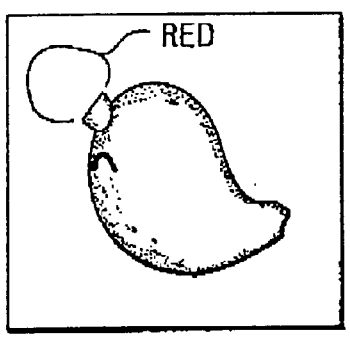
Figure 3S:
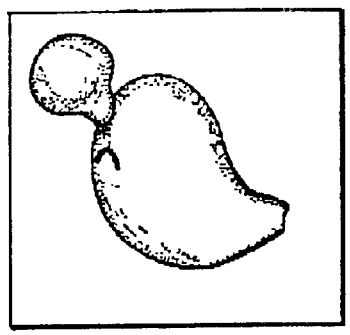
Figure 3T:
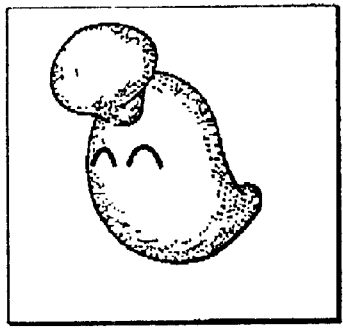
Figure 3U:
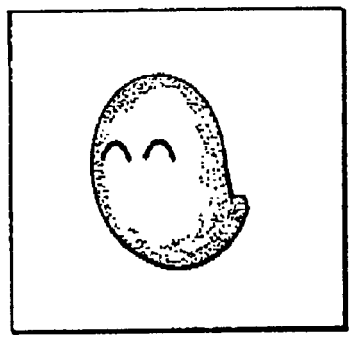
Figure 3V:
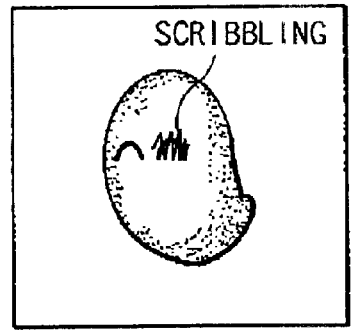
Figure 3W:
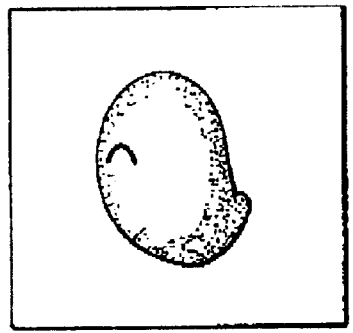
Figure 3X:
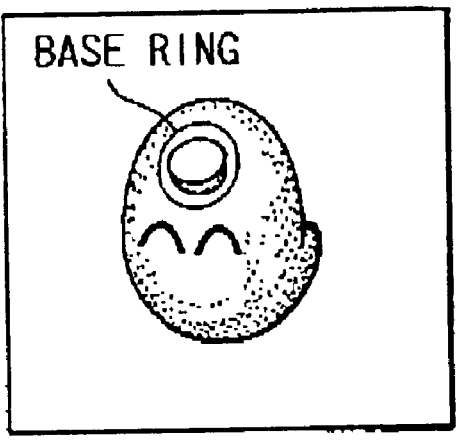
Figure 3Y:
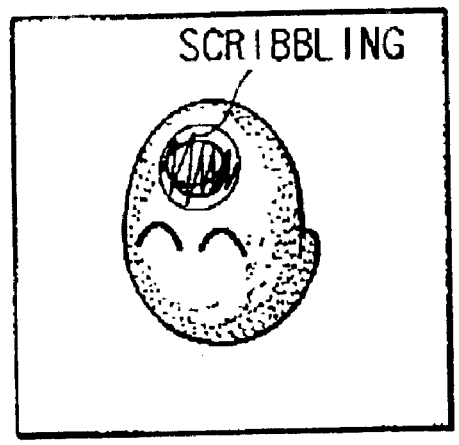
Figure 3Z:
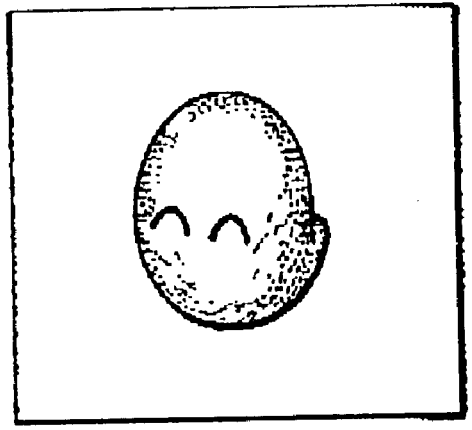
Figure 3Z:
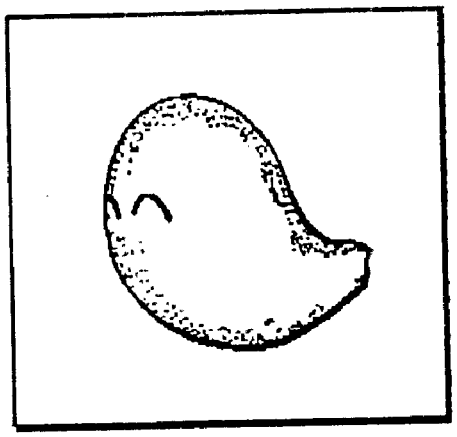

A cutting operation starts when the user draws a stroke that runs across the object, starting and terminating outside its silhouette (FIG. 3o). The stroke divides the object into two pieces at the plane defined by the camera position and the stroke. What is on the screen to the left of the stroke is then removed entirely (FIG. 3p) (as when a carpenter saws off a piece of wood). The cutting operation finishes with a click of the mouse (FIG. 3q). The user can also 'bite' the object using the same operation (FIG. 8).

The cutting stroke turns the section edges red, indicating that the system is in "extrusion made". The user can draw a stroke to extrude the section instead of a click (FIGS. 3r–t, FIG. 9). This "extrusion after cutting" operation is useful to modify the shape without causing creases at the root of the extrusion.

4.6 Smoothing

Figure 10A:
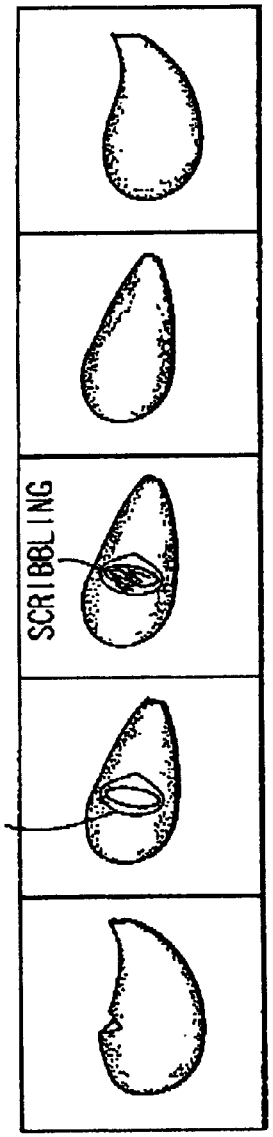
FIGS. 10A–10B is smoothing operation.
Figure 10B:
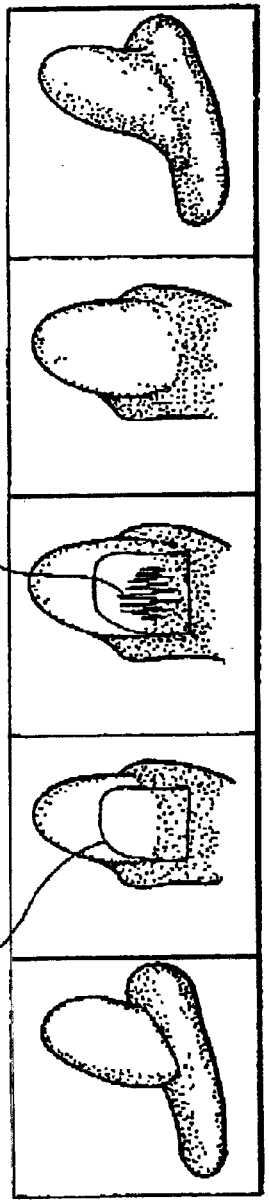

One often smoothes the surface of clay models to eliminate bumps and creases. This system lets the user smooth the surface by drawing a scribble during "extrusion mode." Unlike erasing, this operation modifies the actual geometry: it first removes all the polygons surrounded by the closed red surface line and then creates an entirely new surface that covers the region smoothly. This operation is useful to remove unwanted bumps and cavities (FIGS. 3x–z', FIG. 10a), or to smooth the creases caused by earlier extrusion operations (FIG. 10b).

4.7 Transformation

An additional "transformation" editing operation is possible that distorts the model while preserving the polygonal mesh topology. Although it functions properly, the interface itself is not fully gestural because the modal transition into the bending mode requires a button push.

This operation starts when the user presses the "bend" button and uses two freeform strokes called the reference stroke and the target stroke to modify the model. The system moves vertices of the polygonal model so that the spatial relation between the original position and the target stroke is identical to the relation between the resulting position and the reference stroke. This movement is parallel to the screen, and the vertices do not move perpendicular to the screen. This operation is described in W. T. Correa, R. J. Jensen, C. E. Thayer, and A. Finkelstein. Texture mapping for cel animation. SIGGEAPH 98 Conference Proceedings, pages 435–456, 1998, as warp; this algorithm will not be described further.

Figures 11A, 11B, 11C, 11D, 11E:
FIGS. 11A–11E is examples of transformation (top: bending, bottom: distortion)

Transformation can be used to bend, elongate, and distort the shape (FIG. 11). It is possible to make the system according to the present invention infer the reference stroke automatically from the objectes structure in order to simplify the operation, in a manner similar to the mark-based interaction technique of T. Baudel. A mark-based interaction paradigm for free-hand drawing. UIST'94 Conference Proceedings, pages 185–192, 1994.

5 ALGORITHM

Next, it is described how the system constructs a 3D polygonal mesh from the user's freeform strokes. Internally, a model is represented as a polygonal mesh. Each editing operation modifies the mesh to conform to the shape specified by the user's input strokes (FIG. 12). The resulting model is always topologically equivalent to a sphere.

The algorithms for creation and extrusion are closely related to those for freeform surface construction based on skeletons (J. Bloomenthal and B. Wyvill. Interactive techniques for implicit modeling. 1990 Symposium on Interactive 3D Graphics, pages 109–116, 1990.)(L. Markosian, J. M. Cohen, T. Crulli and J. F. Hughes. Skin; A Constructive Approach to Modeling Free-form Shapes. SIGGRAPH 99, to appear, 1999.), which create a surface around user-defined skeletons using implicit surface techniques. While this embodiment does not use implicit surfaces, they could be used in an alternative implementation.

In order to remove noise in the handwriting input stroke and to construct a regular polygonal mesh, every input stroke is re-sampled to form a smooth polyline with uniform edge length before further processing (J. M. Cohen, L. Markosian, R. C. Zeleznik, J. F. Hughes, and R. Barzel. An Interface for Sketching 3D Curves. 1999 Symposium on Interactive 3D Graphics, pages 17–21, 1999.)

5.1 Creating a New Object

The algorithm according to the present invention creates a new closed polygonal mesh model from the initial stroke. The overall procedure is this: first, a closed planar polygon is created by connecting the start-point and end-point of the stroke, and the spine or axes of the polygon is determined using the chordal axis introduced in L. Prasad. Morphological analysis of shapes. CNLS Newsletter, 139: 1–18, July 1997. Then, the vertices of the spine are elevated by an amount proportional to their distance from the polygon. Finally, a polygonal mesh is constructed wrapping the spine and the polygon in such a way that sections form ovals.

Figure 13C:
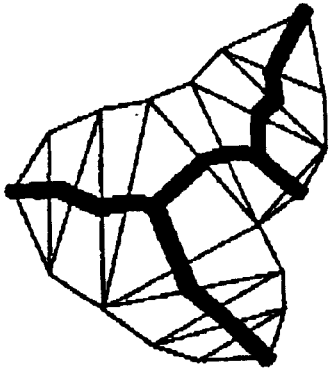
FIG. 13 including FIGS. 13A–13E explains the process of finding the spine.
Figure 13F:
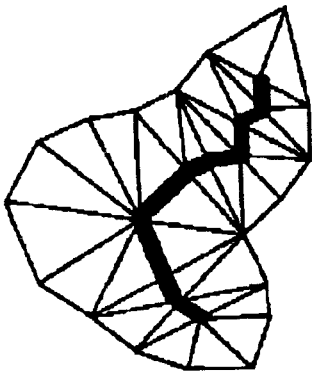
Figure 13B:
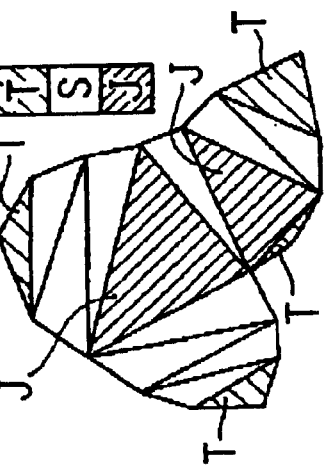
Figure 13E:
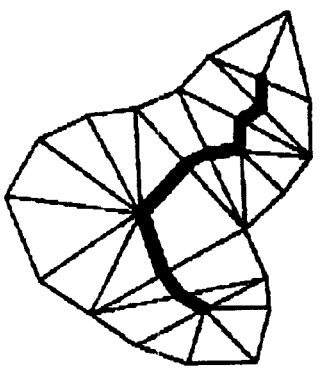
Figure 13A:
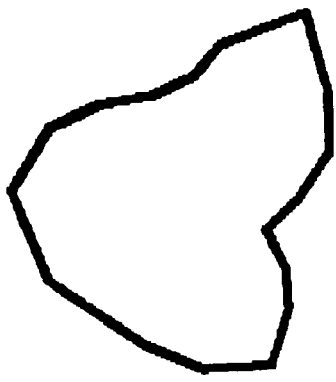

When constructing the initial closed planar polygon, the system makes all edges a predefined unit length (see FIG. 13a). If the polygon is self-intersecting, the algorithm stops and the system requests an alternative stroke. The edges of this initial polygon are called external edges, while edges added in the following triangulation are called internal edges.

The system then performs constrained Delaunay triangulation of the polygon (FIG. 13b). Then, the triangles are divided into three categories: triangles with two external edges (terminal triangle), triangles with one external edge (sleeve triangle), and triangles without external edges (junction triangle). The chordal axis is obtained by connecting the midpoints of the internal edges (FIG. 13c), but the inflation algorithm according to the present invention first requires the pruning of insignificant branches and the retriangulation of the mesh. This pruning algorithm is also introduced in L. Prasad. Morphological analysis of shapes. CNLS Newsletter, 139: 1–18, July 1997.

To prune insignificant branches, each terminal triangle is examined in turn and expanded into progressively larger regions by merging it with adjacent triangles (FIGS. 14a–b). Let X be a terminal triangle; then X has two exterior edges and one interior edge. A semicircle is erected whose diameter is the interior edge, and which lies on the same side of that edge as does X. If all three vertices of X lie on or within this semicircle, the interior edge is removed and X is merged with the triangle that lies on the other side of the edge.

Figure 13D:
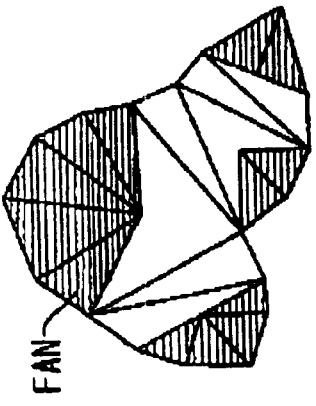

If the newly merged triangle is a sleeve triangle, then X now has three exterior edges and a new interior edge. Again a semicircle is erected on the interior edge and it is checked that all vertices are within it. This is continued until some vertex lies outside the semicircle (FIG. 14c), or until the newly merged triangle is a junction triangle. In the first case, X is triangulated with a "fan" of triangles radiating from the midpoint of the interior edge (FIG. 14d). In the second case, X is triangulated with a fan from the midpoint of the junction triangle (FIGS. 14e–f). The resulting fan triangles are shown in FIG. 13d. The pruned spine is obtained by connecting the midpoints of remaining sleeve and junction triangles, internal edges (FIG. 13e).

The next step is to subdivide the sleeve triangles and junction triangles to make them ready for elevation. These triangles are divided at the spine and the resulting polygons are triangulated, so that now a complete 2D triangular mesh exists between the spine and the perimeter of the initial polygon (FIG. 13f).

Next, each vertex of the spine is elevated proportionally to the average distance between the vertex and the external vertices that are directly connected to the vertex (FIGS. 15a,b). Each internal edge of each fan triangle, excluding spine edges, is converted to a quarter oval (FIG. 15c), and the system constructs an appropriate polygonal mesh by sewing together the neighboring elevated edges, as shown in FIG. 15d. The elevated mesh is copied to the other side to make the mesh closed and symmetric. Finally, the system applies mesh refinement algorithms to remove short edges and small triangles (H. Hoppe, T. DeRose, T. Duchamp, J. McDonald, and W. Stuetzle. Mesh optimization. SIGGRAPH 93 Conference Proceedings, pages 19–26, 1993.).

5.2 Painting on the Surface

Figure 16:
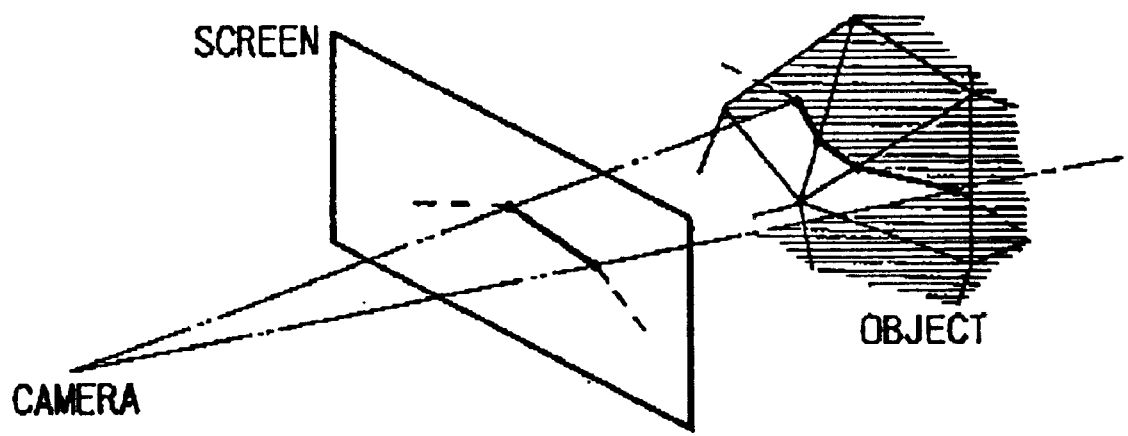
FIG. 16 is construction of surface lines.

The system creates surface lines by sequentially projecting each line segment of the input stroke onto the object's surface polygons. For each line segment, the system first calculates a bounded plane consisting of all rays shot from the camera through the segment on the screen. Then the system finds all intersections between the plane and each polygon of the object, and splices the resulting 3D line segments together (FIG. 16). The actual implementation searches for the intersections efficiently using polygon connectivity information. If a ray from the camera crosses multiple polygons, only the polygon nearest to the camera position is used. If the resulting 3D segments cannot be spliced together (e.g., if the stroke crosses a "fold" of the object), the algorithm fails.

5.3 Extrusion

Figure 17A:
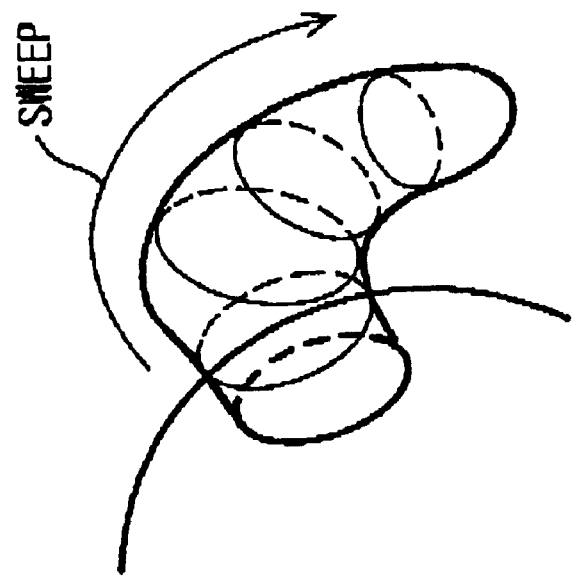
FIG. 17 including FIGS. 17A–17B explains the process of extrusion algorithm.
Figure 17B:
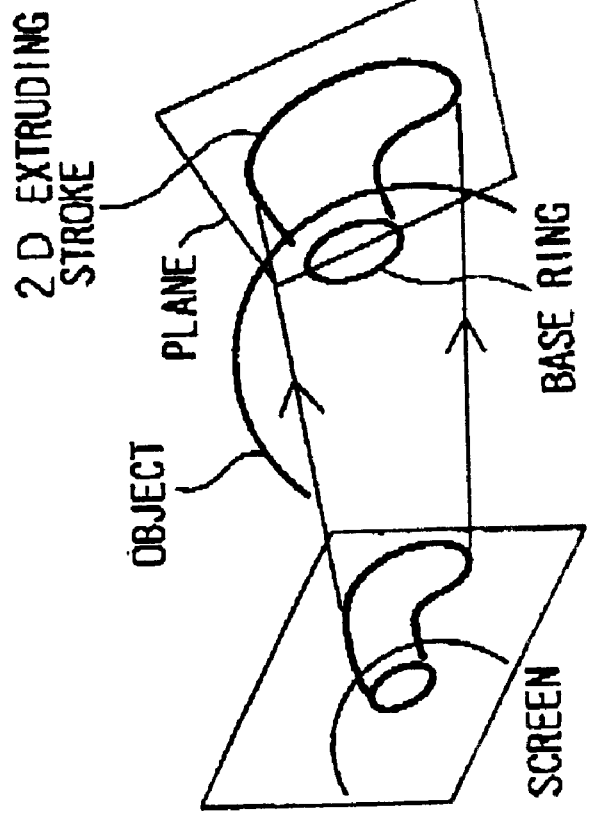

The extrusion algorithm creates new polygonal meshes based on a closed base surface line (called the base ring) and an extruding stroke. Briefly, the 2D extruding stroke is projected onto a plane perpendicular to the object surface (FIG. 17a), and the base ring is swept along the projected extruding stroke (FIG. 17b). The base ring is defined as a closed 3D polyline that lies on the surface of the polygonal mesh, and the normal of the ring is defined as that of the best matching plane of the ring.

First, the system finds the plane for projection: the plane passing through the base ring's center of gravity and lying parallel to the normal of the base ring. Under the above constraints, the plane faces towards the camera as much as possible (FIG. 17a).

The normal of the ring is calculated as follows: Project the points of the ring to the original XY-plane. Then compute the enclosed "signed area" by the formula:

$$Axy=0.5*\text{sum}(i=0, i=n-1, x[i]*y[i+1]-x[i+1]*y[i])$$

(indices are wrapped around so that x[n] means x[0]). Calculate Ayx and Azx similarly, and the vector v=(Ayz, Azx,Axy) is defined as the normal of the ring.

Figure 18B:
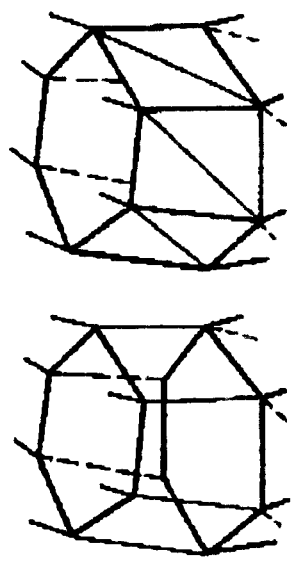
FIG. 18 including FIGS. 18A–18B explains the process of sweeping the base ring.
Figure 18A:
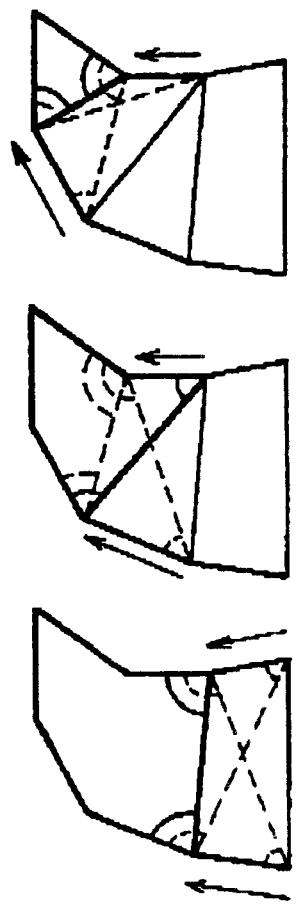

Then the algorithm projects the 2D extruding stroke onto the plane, producing a 3D extruding stroke. Copies of the base ring are created along the extruding stroke in such a way as to be almost perpendicular to the direction of the extrusion, and are resized to fit within the stroke. This is done by advancing two pointers (left and right) along the extruding stroke starting from both ends. In each step, the system chooses the best of the following three possibilities: advance the left pointer, the right pointer, or both. The goodness value increases when the angle between the line connecting the pointers and the direction of the stroke at each pointer is close to 90 degrees (FIG. 18a). This process completes when the two pointers meet.

Finally, the original polygons surrounded by the base ring are deleted, and new polygons are created by sewing the neighboring copies of the base ring together (G. Barequet and M Sharir. Piecewise-linear interpolation between polygonal slices. ACM 10th Computational Geometry Proceedings, pages 93–102, 1994.)(FIG. 18b). The system uses the same algorithm to dig a cavity on the surface.

This simple algorithm works well for a wide variety of extrusions but creates unintuitive shapes when the user draws unexpected extruding strokes or when the base surface is not sufficiently planar (FIG. 19).

5.4 Cutting

Figure 20:
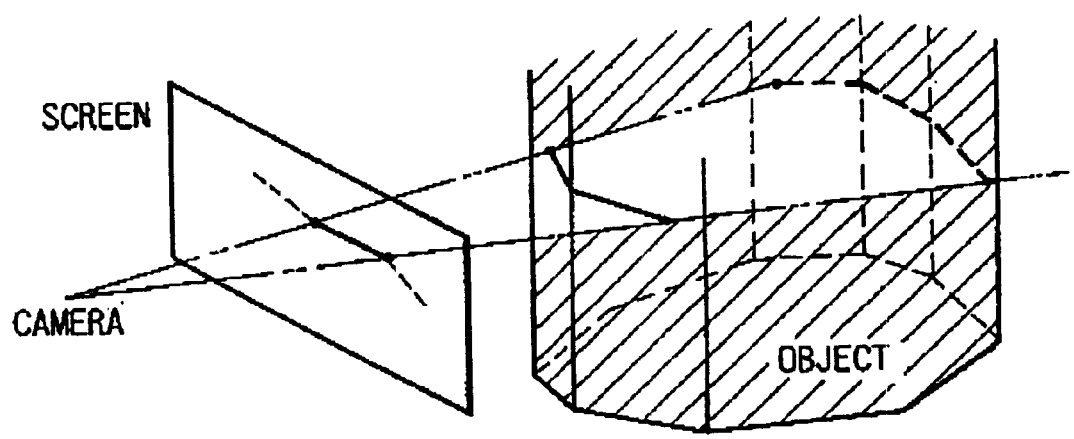
FIG. 20 explains the process of cutting.

The cutting algorithm is based on the painting algorithm. Each line segment of the cutting stroke is projected onto the front and back facing polygons. The system connects the corresponding end points of the projected edges to construct a planer polygon (FIG. 20). This operation is performed for every line segment, and the system constructs the complete section by splicing these planer polygons together. Finally, the system triangulates each planer polygon (J. R. Shewchuk. Triangle: engineering a 2D quality mesh generator and Delauny triangulator. First Workshop on Applied Computational Geometry Proceedings, pages 124–133, 1996.), and removes all polygons to the left of the cutting stroke.

5.5 Smoothing

The smoothing operation deletes the polygons surrounded by the closed surface line (called a ring) and creates new polygons to cover the hole smoothly. First, the system translates the objects into a coordinate system whose Z-axis is parallel to the normal of the ring. Next, the system creates a 2D polygon by projecting the ring onto the XY-plane in the newly created coordinate system, and triangulates the polygon (FIG. 21b). (This embodiment fails if the area surrounded by the ring contains creases and is folded when projected on the XY-plane.) The triangulation is designed to create a good triangular mesh based on J. R. Shewchuk. Triangle: engineering a 2D quality mesh generator and Delauny triangulator. First Workshop on Applied Computational Geometry Proceedings, pages 124–133, 1996: it first creates a constrained Delaunay triangulation and gradually refines the mesh by edge splitting and flipping; then each vertex is elevated along the Z-axis to create a smooth 3D surface (FIG. 21d).

The algorithm for determining the Z-value of a vertex is as follows: For each edge of the ring, consider a plane that passes through the vertex and the midpoint of the edge and is parallel to the Z-axis. Then calculate the z-value of the vertex so that it lies on the 2D Belier curve that smoothly interpolates both ends of the ring on the plane (FIG. 21c). The final z-value of the vertex is the average of these z-values.

Finally, a surface-fairing algorithm (G. Taubin. A signal processing approach to fair surface design. SIGGRAPH 95 Conference Proceedings, pages 351–358, 1995.) is applied to the newly created polygons to enhance smoothness.

6 IMPLEMENTATION

The system is implemented as a 13,000 line Java program. A display-integrated tablet (Mutoh MVT-14) and an electric whiteboard (Xerox Liveboard) were tested in addition to a standard mouse. The mesh construction process is completely real-time, but causes a short pause (a few seconds) when the model becomes complicated. This system can export models in OBJ file format.

Some 3D models created with this system by an expert user and painted using a commercial texture-map editor look quite different from 3D models created in other modeling systems, reflecting the hand-drawn nature of the shape.

7 USER EXPERIENCE

The applet version of this system has undergone limited distribution, and has been used (mainly by computer graphics researchers and students) to create different 3D models. Feedback from these users indicates that this system is quite intuitive and encourages them to explore various 3D designs. In addition, the inventors have started close observation of how first-time users (mainly graduate students in computer science) learn this system. They start with a detailed tutorial. Then they are shown some stuffed animals and asked to create them using this system. Generally, the users begin to create their own models fluently within 10 minutes: five minutes of tutorial and five minutes of guided practice. After that, it takes a few minutes for them to create a stuffed animal.

The present invention is not limited to the above embodiments, and can be modified within the scope of the invention stated in the Claims, and needless to say, these variant forms are included in the scope of the present invention.

What is claimed is:

1. Method for constructing a 3D polygonal surface from a 2D silhouette by using computer, comprising the steps of:
   a creating a new closed polygonal mesh model from an initial stroke;
   determining the spine of the polygon using the chordal axis;
   elevating vertices of said spine by an amount proportional to their distance from the polygon;
   constructing a polygonal mesh by wrapping said spine and said polygon in such a way that sections form ovals.

2. Method for constructing a 3D polygonal surface from a 2D silhouette by using computer according to claim 1, characterized in that said step for creating said new closed polygonal mesh model comprises the steps of:
   making edges of polygon a predefined unit length when an initial closed planar polygon is constructed;
   performing constrained Delaunay triangulation of said polygon.

3. Method for constructing a 3D polygonal surface from a 2D silhouette by using computer according to claim 1, characterized in that said step for determining the spine of the polygon using the chordal axis comprises the steps of:
   connecting midpoints of internal edges of triangles to obtain the chordal axis;
   pruning insignificant branches of the chordal axis to obtain said spine;
   performing retriangulation of mesh.

4. Method for constructing a 3D polygonal surface from a 2D silhouette by using computer according to claim 3, characterized in that said step for pruning insignificant branches of the chordal axis comprises the steps of:
   examining each terminal triangle which has two exterior edges and one interior edge;
   erecting a semicircle whose diameter is the interior edge and which lies on the same side of said exterior edges;
   removing said interior edge;
   merging said terminal triangle with triangle that lies on the other side of said exterior edges if all three vertices of said terminal triangle lie on and/or within said semicircle;
   repeating said erecting step, said removing step and said merging step until some vertex lies outside said semicircle;
   triangulating the merged triangle with a fan of triangles radiating from the midpoint of interior edge;
   obtaining pruned spine by connecting the midpoints of remaining triangles' internal edges.

5. Method for constructing a 3D polygonal surface from a 2D silhouette by using computer according to claim 3, characterized in that said step for pruning insignificant branches of the chordal axis comprises the steps of:
   examining each terminal triangle which has two exterior edges and one interior edge;
   erecting a semicircle whose diameter is the interior edge and which lies on the same side of said exterior edges;
   removing said interior edge;
   merging said terminal triangle with triangle that lies on the other side of said exterior edges if all three vertices of said terminal triangle lie on and/or within said semicircle;
   repeating said erecting step, said removing step and said merging step until newly merged triangle is a junction triangle;
   triangulating the merged triangle with a fan from the midpoint of the junction triangle;
   obtaining pruned spine by connecting the midpoints of remaining triangles' internal edges.

6. Method for constructing a 3D polygonal surface from a 2D silhouette by using computer according to claim 3, characterized in that said step for performing retriangulation of mesh comprises the step of:
   dividing triangles in said polygon at said spine so that a complete 2D triangular mesh exists between said spine and the perimeter of said polygon.

7. Method for constructing a 3D polygonal surface from a 2D silhouette by using computer according to claim 1, characterized in that said step for elevating vertices of said spine by an amount proportional to their distance from the polygon comprises the steps of;
   elevating each vertex of said spine proportionally to the average distance between the vertex and the external vertices that are directly connected to the vertex;
   converting, excluding spine edges, each internal edge of each fan triangle to a quarter oval.

8. Method for constructing a 3D polygonal surface from a 2D silhouette by using computer according to claim 1, characterized in that said step for constructing a polygonal mesh by wrapping said spine and said polygon comprises the steps of;
   constructing an appropriate polygonal mesh by sewing together the neighboring elevated edges;
   copying the elevated mesh to the other side to make the mesh closed and symmetric.

9. Method for constructing a 3D polygonal surface from a 2D silhouette by using computer according to claim 1, further comprising the steps of:
   creating a closed base ring on an object;
   projecting 2D extruding stroke onto a plane perpendicular to said object surface;
   sweeping said base ring along a projected extruding stroke;
   wherein said base ring is defined as a closed 3D polyline that lies on the surface of the polygonal mesh, and the normal of said base ring is defined as that of the best matching plane of said base ring.

10. Method for constructing a 3D polygonal surface from a 2D silhouette by using computer according to claim 1, further comprising the steps of:
    finding a plane for projection, said plane is passing through center of gravity of a closed base ring on an object and lying parallel to the normal of said base ring;

creating copies of said base ring along a extruding stroke in such a way as to be almost perpendicular to the direction of the extrusion;

resizing said copies to fit within the stroke by advancing left and right pointers along the extruding stroke starting from both ends;

deleting original polygons surrounded by said base ring;

creating new polygons by sewing the neighboring copies of said base ring together.

11. Method for constructing a 3D polygonal surface from a 2D silhouette by using computer according to claim 10, characterized in that said step for finding a plane for projection comprises the steps of;

projecting points of said base ring to original XY-plane;

computing enclosed signed area by the formula;

$$Axy=0.5*sum(i=0, i=n-1, x[i]*y[i+1]-x[i+1]*y[i])$$

$$Ayz=0.5*sum(i=0, i=n-1, y[i]*z[i+1]-y[i+1]*z[i])$$

$$Azx=0.5*sum(i=0, i=n-1, z[i]*x[i+1]-z[i+1]*x[i])$$

defining a vector v=(Ayz,Azx,Axy) as the normal of said base ring;

wherein indices are wrapped around so that x[n] means x[0].

12. Method for constructing a 3D polygonal surface from a 2D silhouette by using computer according to claim 1, further comprising the steps of:

projecting each line segment of cutting stroke onto the front and back facing polygons;

connecting corresponding end points of the projected edges to construct a planer polygon;

triangulating each planer polygon;

removing polygons to one side of the cutting stroke.

13. Method for constructing a 3D polygonal surface from a 2D silhouette by using computer according to claim 1, further comprising the steps of:

deleting polygons surrounded by a closed surface ring on object;

creating new polygons to cover hole made by said deleting step smoothly.

14. Method for constructing a 3D polygonal surface from a 2D silhouette by using computer according to claim 1, further comprising the steps of:

translating object into a coordinate system whose Z-axis is parallel to the normal of a closed surface ring on said object;

creating a 2D polygon by projecting said ring onto XY-plane in newly created coordinate system;

triangulating the polygon to create a constrained Delannay triangulation and gradually refine the mesh by edge splitting and flipping;

setting, for each edge of the ring, a plane that passes through the vertex and the midpoint of the edge and is parallel to the Z-axis;

calculating the z-value of the vertex so that it lies on the 2D Bezier curve that smoothly interpolates both ends of the ring on the plane;

elevating each vertex along the Z-axis to the z-value to create a smooth 3D surface.

15. Method for constructing a 3D polygonal surface from a 2D silhouette by using computer according to claim 14, further comprising the steps of:

applying a surface-fairing algorithm to newly created polygons to enhance smoothness.

16. Method for constructing a 3D polygonal surface from a 2D silhouette by using computer according to claim 1, characterized in that said step for creating the new closed polygonal mesh model comprises the steps of;

creating a closed planar polygon by connecting the startpoint and end-point of the stroke;

determining the spine and/or axes of the polygon using the chordal axis.

17. Apparatus for constructing a 3D polygonal surface from a 2D silhouette, comprising:

a first section for creating a new closed polygonal mesh model from an initial stroke;

a second section for determining the spine of the polygon using the chordal axis;

a third section for elevating vertices of said spine by an amount proportional to their distance from the polygon;

a forth section for constructing a polygonal mesh by wrapping said spine and said polygon in such a way that sections form ovals.

18. A medium recording a program for constructing a 3D polygonal surface from a 2D silhouette, which creates a new closed polygonal mesh model from an initial stroke; determines the spine of the polygon using the chordal axis; elevates vertices of said spine by an amount proportional to their distance from the polygon; constructs a polygonal mesh by wrapping said spine and said polygon in such a way that sections form ovals.

* * * * *